(12) United States Patent
Lee et al.

(10) Patent No.: US 12,124,146 B2
(45) Date of Patent: Oct. 22, 2024

(54) DISPLAY DEVICE

(71) Applicant: AUO Corporation, Hsinchu (TW)

(72) Inventors: Chun-Han Lee, Hsinchu (TW); Chien-Chuan Chen, Hsinchu (TW); Ju-Wen Chang, Hsinchu (TW); Hsin Chiang Chiang, Hsinchu (TW); Peng-Yu Chen, Hsinchu (TW)

(73) Assignee: AUO Corporation, Hsinchu (TW)

( * ) Notice: Subject to any disclaimer, the term of this patent is extended or adjusted under 35 U.S.C. 154(b) by 0 days.

(21) Appl. No.: 18/492,774

(22) Filed: Oct. 23, 2023

(65) Prior Publication Data

US 2024/0134239 A1    Apr. 25, 2024
US 2024/0231167 A9    Jul. 11, 2024

(30) Foreign Application Priority Data

Oct. 25, 2022 (TW) ................................... 111140426
Nov. 16, 2022 (TW) ................................... 111143807
Nov. 21, 2022 (TW) ................................... 111144355

(51) Int. Cl.
*G02F 1/137* (2006.01)
*G02F 1/1333* (2006.01)
(Continued)

(52) U.S. Cl.
CPC .... *G02F 1/13718* (2013.01); *G02F 1/133305* (2013.01); *G02F 1/133541* (2021.01); *G02F 1/134309* (2013.01)

(58) Field of Classification Search
CPC ........... G02F 1/13718; G02F 1/133377; G02F 1/13338; G06F 3/0412; G06F 3/044
See application file for complete search history.

(56) References Cited

U.S. PATENT DOCUMENTS 5,576,866 A * 11/1996 Yamada ............ G02F 1/133377
349/155
10,705,365 B2    7/2020 Van Oosten
(Continued)

FOREIGN PATENT DOCUMENTS

CN        206773361       12/2017
CN        209746323       12/2019
(Continued)

*Primary Examiner* — Jessica M Merlin
(74) *Attorney, Agent, or Firm* — JCIPRNET

(57) ABSTRACT

A display device including a substrate, a cholesteric liquid crystal layer, and a transparent electrode layer that are sequentially stacked is provided. The cholesteric liquid crystal layer includes cholesteric liquid crystal molecules and a plurality of transparent photoresist structures. Each of the transparent photoresist structures is a closed structure, and the cholesteric liquid crystal molecules are respectively accommodated in a plurality of patterned areas respectively surrounded by the transparent photoresist structures, so as to form a plurality of cholesteric liquid crystal patterns. The transparent electrode layer includes a plurality of sub-electrodes. The cholesteric liquid crystal patterns are respectively driven by the sub-electrodes. An orthogonal projection of each of the transparent photoresist structures on the substrate falls in an orthogonal projection of a corresponding sub-electrode of the sub-electrodes on the substrate.

6 Claims, 20 Drawing Sheets

(51) Int. Cl.
 G02F 1/1335 (2006.01)
 G02F 1/1343 (2006.01)

(56) References Cited

U.S. PATENT DOCUMENTS

| | | | |
|---|---|---|---|
| 11,314,138 | B2 | 4/2022 | Chen et al. |
| 2012/0099030 | A1* | 4/2012 | Pishnyak ............ G02F 1/13718 349/1 |
| 2016/0274699 | A1* | 9/2016 | Shishido ............... G06F 3/0446 |
| 2018/0210272 | A1 | 7/2018 | Van Oosten |
| 2021/0286205 | A1 | 9/2021 | Chen et al. |
| 2023/0203377 | A1 | 6/2023 | Hayata et al. |

FOREIGN PATENT DOCUMENTS

| | | |
|---|---|---|
| CN | 109119444 | 8/2020 |
| CN | 111487701 | 8/2020 |
| CN | 114217485 | 3/2022 |
| CN | 113325622 | 7/2022 |
| CN | 112198704 | 3/2023 |
| CN | 110109310 | 7/2023 |
| JP | 2004245976 | 9/2004 |
| TW | 201708902 | 3/2017 |
| TW | 202134696 | 9/2021 |
| WO | 2022059790 | 3/2022 |

* cited by examiner

DISPLAY DEVICE

CROSS-REFERENCE TO RELATED APPLICATION

This application claims the priority benefit of Taiwan application serial no. 111140426, filed on Oct. 25, 2022, Taiwan application serial no. 111143807, filed on Nov. 16, 2022, and Taiwan application serial no. 111144355, filed on Nov. 21, 2022. The entirety of each of the above-mentioned patent applications is hereby incorporated by reference herein and made a part of this specification.

BACKGROUND

Technical Field

The disclosure relates to a display device.

Description of Related Art

Cholesteric liquid crystal represents a specific category of liquid crystal molecules characterized by bistable properties. These molecules possess the ability to reflect circularly polarized light with a wavelength corresponding to their pitch and thus can serve to display decorative patterns on display devices.

To provide users with the flexibility to selectively display the decorative patterns based on demand, conventional approaches have relied on complex pixel array structures or stacked structures, thus leading to significant manufacturing expenses and environmental challenges. Consequently, there is a critical necessity for an affordable and environmentally sustainable cholesteric liquid crystal display device.

SUMMARY

The disclosure provides a display device that eliminates the need for a complex array structure to switch the presence or absence of decorative patterns and is characterized by its cost-effectiveness and environmentally friendly design.

According to an embodiment of the disclosure, a display device including a lower substrate, a lower transparent electrode layer, a cholesteric liquid crystal layer, an upper transparent electrode layer, and an upper substrate that are sequentially stacked is provided. The cholesteric liquid crystal layer includes cholesteric liquid crystal molecules and a plurality of transparent photoresist structures. Each of the transparent photoresist structures is a closed structure, and the cholesteric liquid crystal molecules are respectively accommodated in a plurality of patterned areas respectively surrounded by the transparent photoresist structures, so as to form a plurality of cholesteric liquid crystal patterns. The transparent electrode layer includes a plurality of sub-electrodes. The upper transparent electrode layer is a patterned electrode layer and includes a plurality of sub-electrodes. The lower transparent electrode layer is configured as a common electrode. The cholesteric liquid crystal patterns are respectively driven by the sub-electrodes. An orthogonal projection of each of the transparent photoresist structures on the lower substrate falls in an orthogonal projection of a corresponding sub-electrode of the sub-electrodes on the lower substrate.

According to an embodiment of the disclosure, a display device including a lower substrate, a lower transparent electrode layer, a cholesteric liquid crystal layer, an upper transparent electrode layer, and an upper substrate that are sequentially stacked is provided. The cholesteric liquid crystal layer includes cholesteric liquid crystal molecules and a plurality of transparent photoresist structures. Each of the transparent photoresist structures is a closed structure, and the cholesteric liquid crystal molecules are respectively accommodated in a plurality of patterned areas respectively surrounded by the transparent photoresist structures, so as to form a plurality of cholesteric liquid crystal patterns. The transparent electrode layer includes a plurality of first sub-electrodes and a plurality of second sub-electrodes. The first sub-electrodes and the second sub-electrodes are alternately arranged to form a plurality of mutual capacitances. The lower transparent electrode layer is configured as a common electrode. The cholesteric liquid crystal patterns are respectively driven by the first sub-electrodes, and an orthogonal projection of each of the transparent photoresist structures on the lower substrate falls within an orthogonal projection of a corresponding first sub-electrode of the first sub-electrodes on the lower substrate.

In view of the above, the display device provided in one or more embodiments of the disclosure defines the cholesteric liquid crystal patterns by the transparent photoresist structures and drives the cholesteric liquid crystal patterns by the sub-electrodes of the transparent electrode layers. The cholesteric liquid crystal layer has the simple structure and does not require any complex array structure, and it is likely to switch the presence or absence of the decorative patterns. Compared to the conventional display device which is able to switch the presence or absence of the decorative patterns, the display device provided in this embodiment is characterized by its cost-effectiveness and environmentally friendly design.

Several exemplary embodiments accompanied with figures are described in detail below to further describe the disclosure in details.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
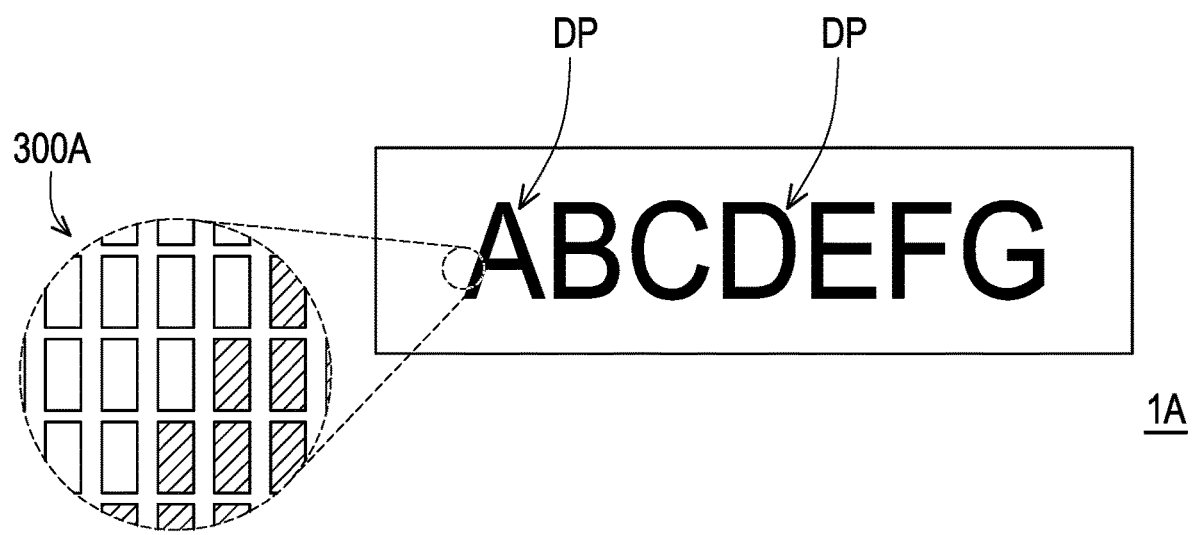
FIG. 1 is a schematic diagram illustrating a display device according to a comparative example.

Reference will now be made in detail to the exemplary embodiments of the disclosure, and examples of the exemplary embodiments are illustrated in the accompanying drawings. Whenever possible, the same reference numbers are used in the drawings and descriptions to indicate the same or similar parts.

Please refer to FIG. 1, which is a schematic diagram illustrating a display device according to a comparative example. A display device 1A includes a plurality of pixels, and the cholesteric liquid crystal molecules in each pixel are controlled by switching elements (such as thin film transistors) to provide a plurality of cholesteric liquid crystal patterns DP. However, such an array structure is complex, thus leading to high manufacturing costs and environmental concern. Please refer to FIG. 2A, FIG. 2B, FIG. 2C, and FIG. 2D. A display device 1 provided in an embodiment of the disclosure may display a plurality of cholesteric liquid crystal patterns (decorative patterns) DPi, and includes a lower substrate 10, a lower transparent electrode layer 100, a cholesteric liquid crystal layer 300, an upper transparent electrode layer 200, and an upper substrate 20 that are sequentially stacked. The cholesteric liquid crystal layer 300 includes cholesteric liquid crystal molecules CLC and a plurality of transparent photoresist structures 300W. The lower transparent electrode layer 100 is configured as a common electrode.

Figure 2A:
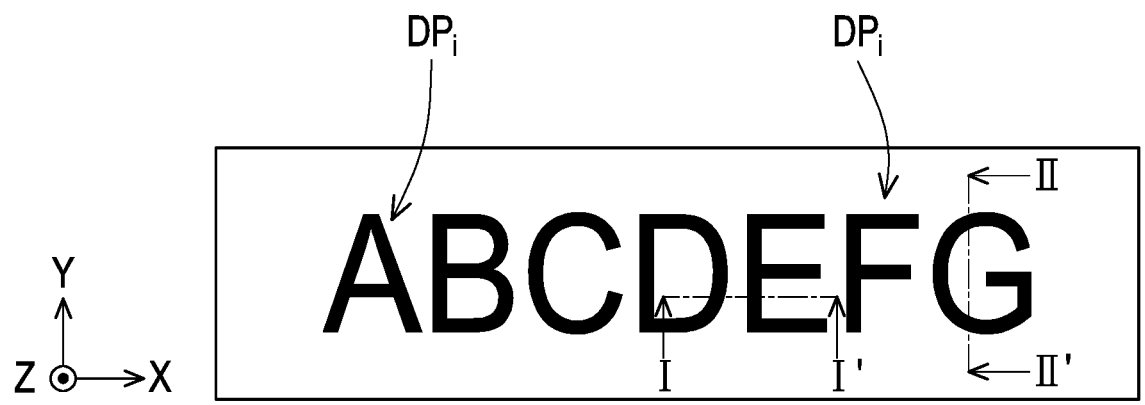
FIG. 2A is a schematic diagram illustrating a display device according to an embodiment of the disclosure.
Figure 2B:
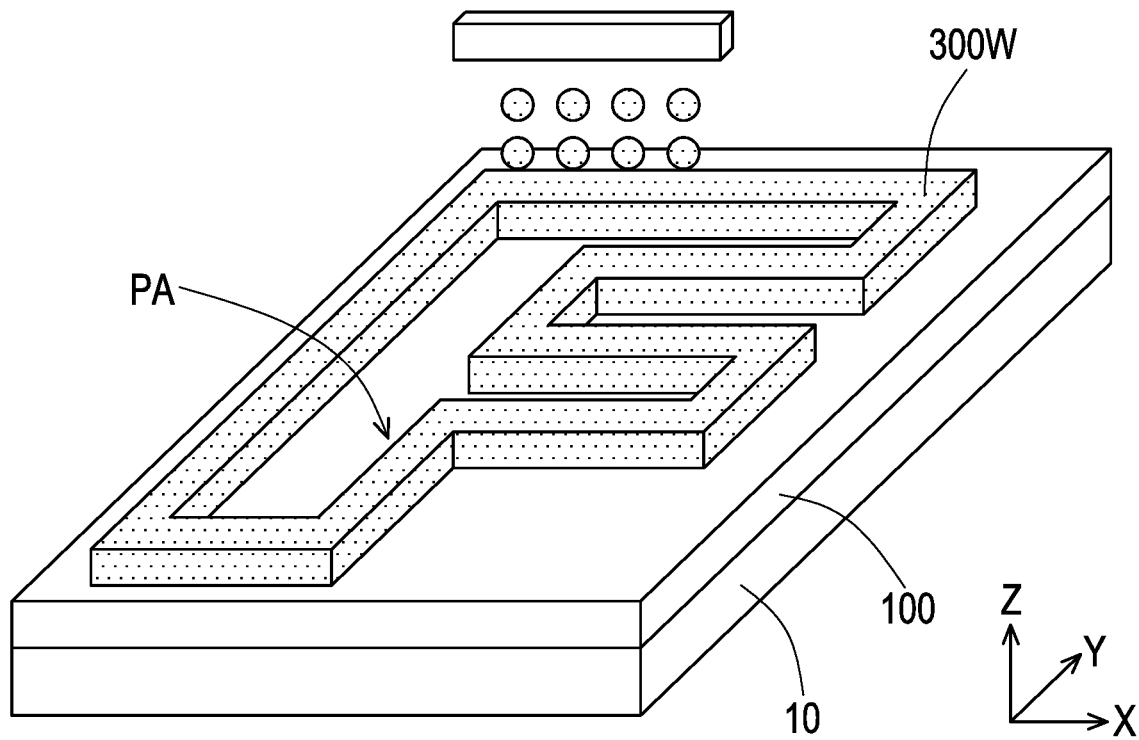
FIG. 2B and FIG. 2C are schematic diagrams illustrating a method for manufacturing a display device according to an embodiment of the disclosure.
Figure 2C:
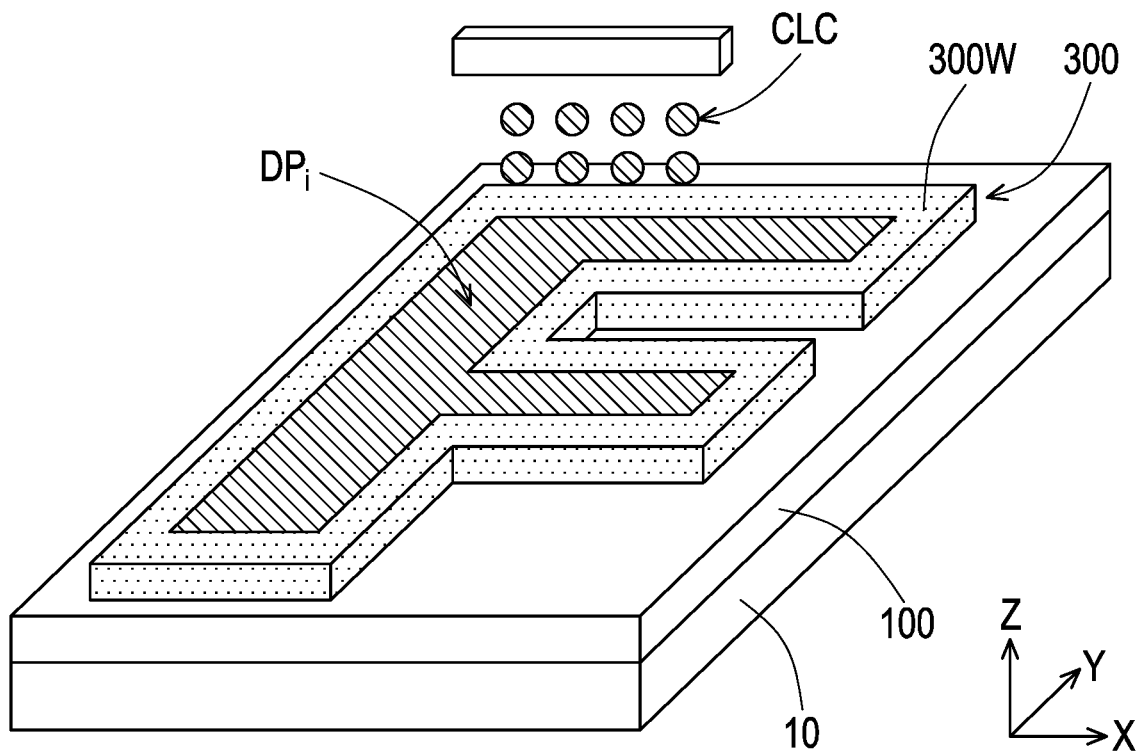

In some embodiments, as shown in FIG. 2B and FIG. 2C, the transparent photoresist structures 300W and the cholesteric liquid crystal molecules CLC may be configured by performing a printing process. Each of the transparent photoresist structures 300W forms a closed structure in an X-Y plane, which encloses a patterned area PA. Since the transparent photoresist structures 300W are formed by performing a printing process, the shape of the patterned areas PA may be designed according to actual needs. Therefore, different transparent photoresist structures 300W may form the patterned areas PA of different shapes. The cholesteric liquid crystal molecules CLC are accommodated in different patterned areas PA, thus forming the cholesteric liquid crystal patterns DPi. When the cholesteric liquid crystal molecules CLC in the patterned areas PA are in a planar state, the cholesteric liquid crystal patterns DPi are displayed and are visible. When the cholesteric liquid crystal molecules CLC in the patterned areas PA are in a focal conic state, the cholesteric liquid crystal patterns DPi are not displayed and are invisible.

In some embodiments, the transparent photoresist structure 300W may further have hydrophobicity to reduce the adhesion of the cholesteric liquid crystal molecules CLC on the transparent photoresist structures 300W. As such, in addition to physical restrictions caused by the surrounding of the transparent photoresist structures 300W, the cholesteric liquid crystal molecules CLC may be further restricted within the patterned areas PA surrounded and formed by the transparent photoresist structures 300W due to their own cohesive force being greater than the aforementioned adhesion force, thus preventing the cholesteric liquid crystal molecules CLC from leaking to the outside of the transparent photoresist structures 300W.

The upper transparent electrode layer 200 is a patterned electrode layer and includes a plurality of sub-electrodes. In some embodiments, the sub-electrodes corresponding to different cholesteric liquid crystal patterns DPi are electrically connected. However, this should not be construed as a limitation in the disclosure; in some embodiments, the sub-electrodes corresponding to different cholesteric liquid crystal patterns DPi are electrically insulated.

Figure 2D:
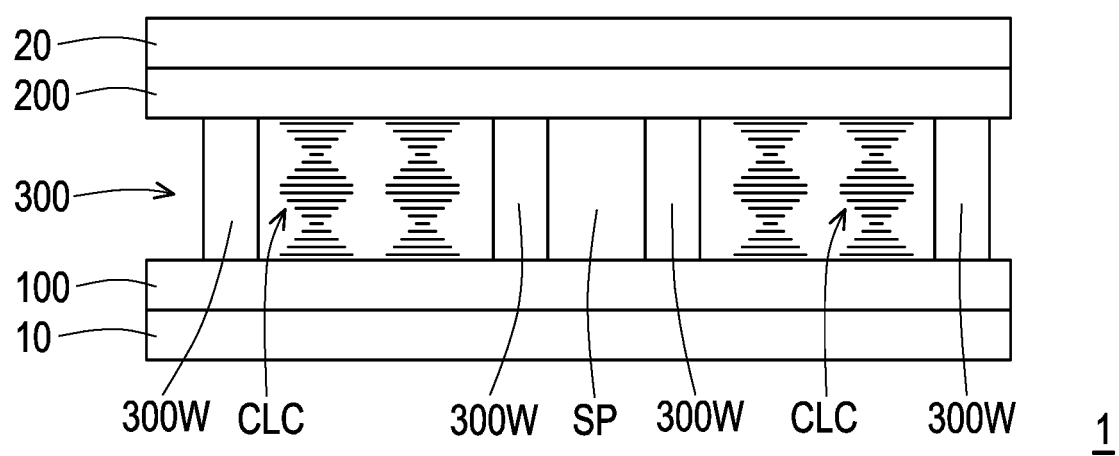
FIG. 2D is a schematic partial cross-sectional diagram illustrating the display device in FIG. 2A.

Specifically, with reference to FIG. 2A and FIG. 2D, in an embodiment, FIG. 2D is a schematic cross-sectional diagram taken along a line segment I-I' in FIG. 2A, and there is a gap SP between different cholesteric liquid crystal patterns DPi (the English letters D and E in FIG. 2A); the gap SP corresponds to the same sub-electrode of the upper transparent electrode layer 200 or corresponds to the sub-electrodes that are electrically connected. The gap SP separates two independent cholesteric liquid crystal patterns DPi, and there is no liquid crystal molecule within the gap SP. In such a case, these different cholesteric liquid crystal patterns DPi (the English letters D and E in FIG. 2A) may be displayed or not displayed at the same time.

By contrast, in an embodiment, FIG. 2D is a schematic cross-sectional diagram taken along a line segment II-II' in FIG. 2A, where a sub-electrode corresponds to one single cholesteric liquid crystal pattern DPi (the English letter G in FIG. 2A), different cholesteric liquid crystal patterns DPi (the English letters A, B, C, D, E, F, and G in FIG. 2A) correspond to different sub-electrodes, and the different sub-electrodes are electrically insulated. In such a case, these cholesteric liquid crystal patterns DPi (the English letters A, B, C, D, E, F, and G in FIG. 2A) may be independently driven by different sub-electrodes and may be displayed or not displayed.

It should be particularly noted that, as shown in FIG. 2D, an orthogonal projection of each of the transparent photoresist structures 300W and the cholesteric liquid crystal patterns DPi formed around the each of the transparent photoresist structures 300W on the lower substrate 10 falls within an orthogonal projection of the corresponding sub-electrode on the lower substrate 10, so as to ensure the integrity of each of the cholesteric liquid crystal patterns DPi (the English letters A, B, C, D, E, F, and G in FIG. 2A) when the each of the cholesteric liquid crystal patterns DPi is displayed. This avoids defects in the pattern shape because the area occupied by the sub-electrode is too small or fails to completely cover the transparent photoresist structure 300W and the cholesteric liquid crystal pattern DPi, e.g., gaps or cracks in the pattern. In some embodiments, the orthogonal projection of each of the transparent photoresist structures 300W and the cholesteric liquid crystal patterns DPi formed around the each of the transparent photoresist structures 300W on the lower substrate 10 falls within and is smaller than the orthogonal projection of the corresponding sub-electrode on the lower substrate 10.

To fully illustrate various embodiments of the disclosure, other embodiments of the disclosure will be described below. It should be noted that the reference numbers and some content of the previous embodiments are used in the following embodiments, where the same reference numbers serve to represent the same or similar components, and the description of the same technical content is omitted. For the description of the omitted parts, please refer to the previous embodiments, and the description of the omitted parts will not be redundantly repeated in the following embodiments.

Figure 3:
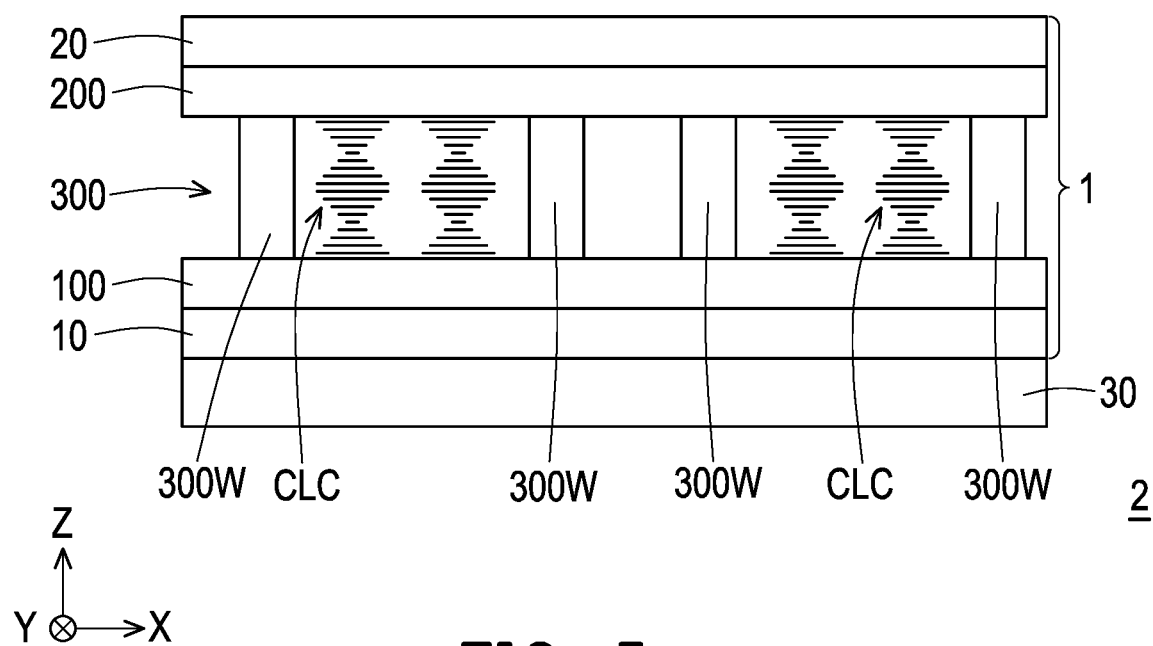
FIG. 3 is a schematic diagram illustrating a display device according to an embodiment of the disclosure.

With reference to FIG. 3, compared to the display device provided in above embodiments, a display device 2 provided in some embodiments of the disclosure may further include a display panel 30 disposed below the lower substrate 10. In other words, the display device 1 is disposed on the display panel 30, which constitutes the display device 2. The display device 2 may simultaneously display the cholesteric liquid crystal patterns DPi of the display device 1 and images of the display panel 30.

Figure 4A:
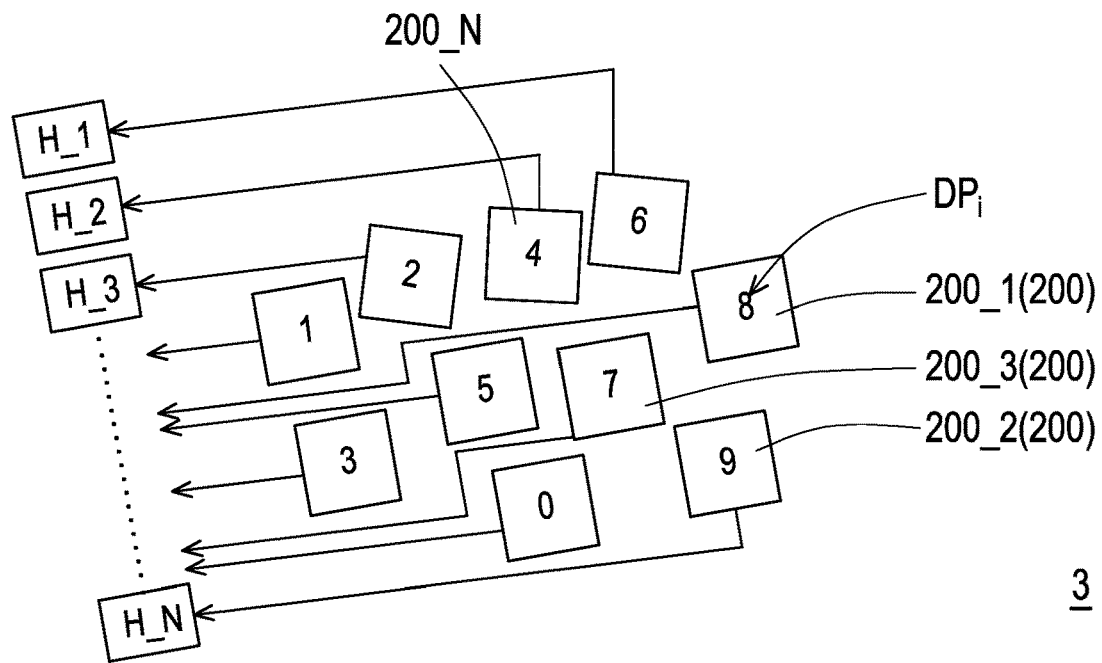
FIG. 4A is a schematic diagram illustrating a display device according to an embodiment of the disclosure.
Figure 4B:
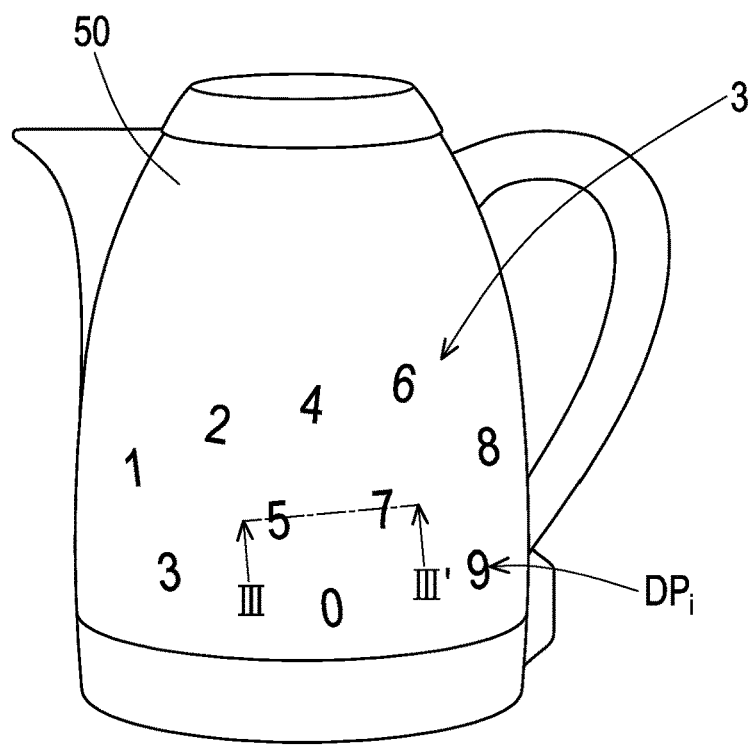
FIG. 4B is a schematic diagram illustrating an application of the display device in FIG. 4A.
Figure 4C:
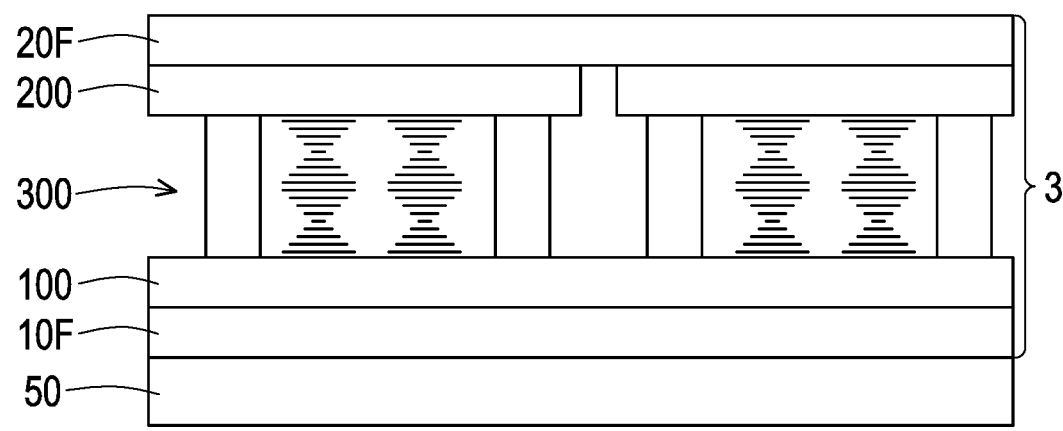
FIG. 4C is a schematic partial cross-sectional diagram of FIG. 4B.

With reference to FIG. 4A, FIG. 4B, and FIG. 4C, where FIG. 4C is a schematic partial cross-sectional diagram taken alone a line segment III-III' in FIG. 4B. Compared to the display device 1, a display device 3 has a lower substrate 10F and an upper substrate 20F that are flexible substrates. Therefore, the display device 3 may be configured on a surface of an object 50, and the surface of the object 50 may be a curved surface. In addition, the upper transparent electrode layer 200 is a patterned electrode layer and includes a plurality of independent sub-electrodes 200_1, 200_2, 200_3, . . . , and 200_N, which are insulated from each other, and each of the sub-electrodes 200_1, 200_2, 200_3, . . . , and 200_N exclusively corresponds to the cholesteric liquid crystal pattern DPi.

In this embodiment, different cholesteric liquid crystal patterns DPi are driven by different sub-electrodes 200_1, 200_2, 200_3, . . . , and 200_N, respectively. By applying a self capacitance sensing method and taking the sub-electrodes 200_1, 200_2, 200_3, . . . , and 200_N as touch electrodes, different driving and sensing circuits H_1, H_2, H_3, . . . , and H_N are connected through different wires. When a finger touches the display device 3, a sufficiently large coupling capacitance is generated between the sub-electrodes 200_1, 200_2, 200_3, . . . or 200_N and the finger. The capacitance change measured by the sub-electrodes 200_1, 200_2, 200_3, . . . or 200_N serves to infer the cholesteric liquid crystal pattern DPi selected by the user.

Figure 5A:
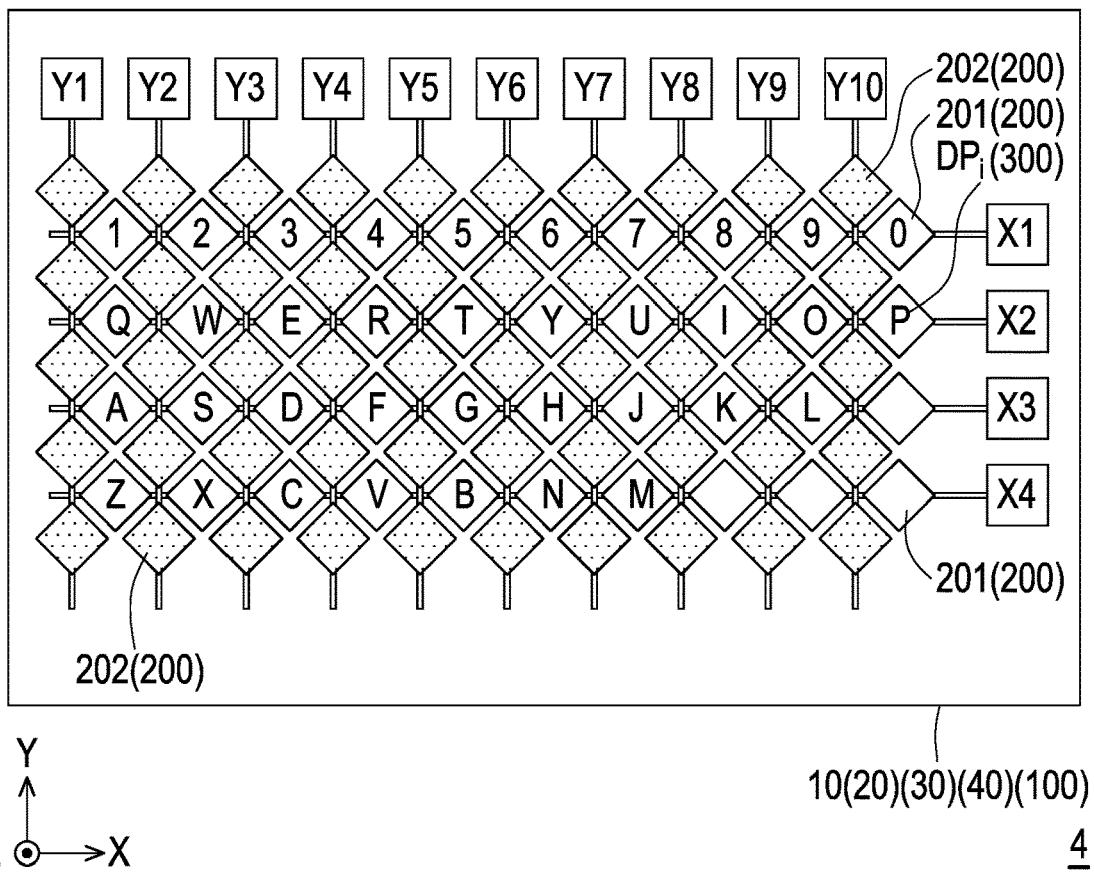
FIG. 5A is a schematic diagram illustrating a display device according to an embodiment of the disclosure.
Figure 5B:
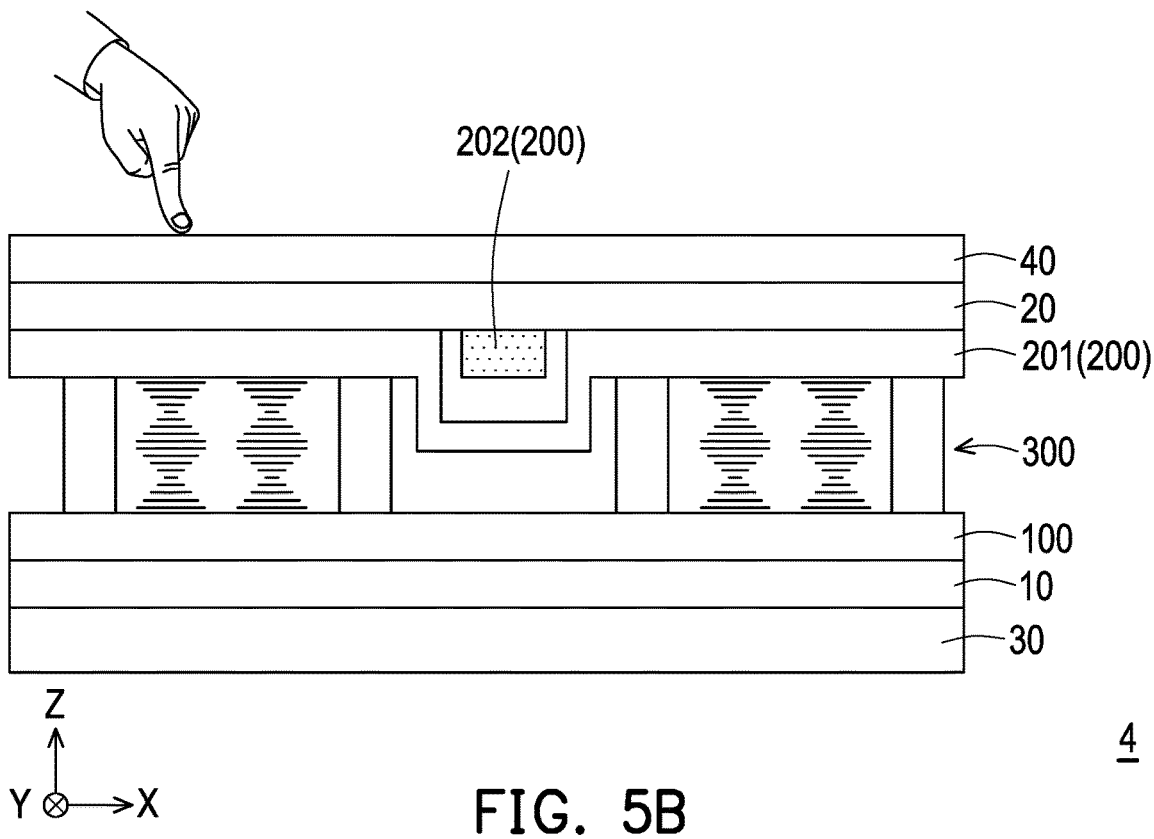
FIG. 5B is a schematic partial cross-sectional diagram illustrating the display device in FIG. 5A.

Please refer to FIG. 5A to FIG. 5E, where FIG. 5B may be, for instance, a schematic partial cross-sectional diagram taken along a direction of a line connecting English letters T and Y in FIG. 5A.

The upper transparent electrode layer 200 of a display device 4 is a patterned electrode layer and includes a plurality of independent sub-electrodes 201 and a plurality of independent sub-electrodes 202. In addition to driving the cholesteric liquid crystal patterns DPi, the sub-electrodes 201, together with the sub-electrodes 202, may further serve as the touch electrodes. The display device 4 is further equipped with a protective layer 40 for the user to touch.

Specifically, the independent sub-electrodes 201 are arranged along a Y direction and are respectively connected to the driving circuits X1-X4, and the independent sub-electrodes 202 are arranged along an X direction and are respectively connected to the sensing circuits Y1-Y10. By applying a mutual capacitance sensing method, in the first half of a time period, the independent sub-electrodes 201 are driven sequentially by the driving circuits X1-X4, so that capacitors formed at locations where the sub-electrodes 201 and the sub-electrodes 202 are adjacent are charged. In the second half of the same time period, voltages on the independent sub-electrodes 202 are sensed sequentially by the sensing circuits Y1-Y10 to obtain 4×10 data. Therefore, when a user selects a cholesteric liquid crystal pattern DPi on the display device 4 with a finger, which cholesteric liquid crystal pattern DPi has been selected may be learned based on the 4×10 data.

Note that this embodiment illustrates 4 independent sub-electrodes 201 and 4 corresponding driving circuits X1-X4 as well as illustrates 10 independent sub-electrodes 202 and 10 corresponding sensing circuits Y1-Y10, but the number of such components is not limited to what is described above.

Figure 5C:
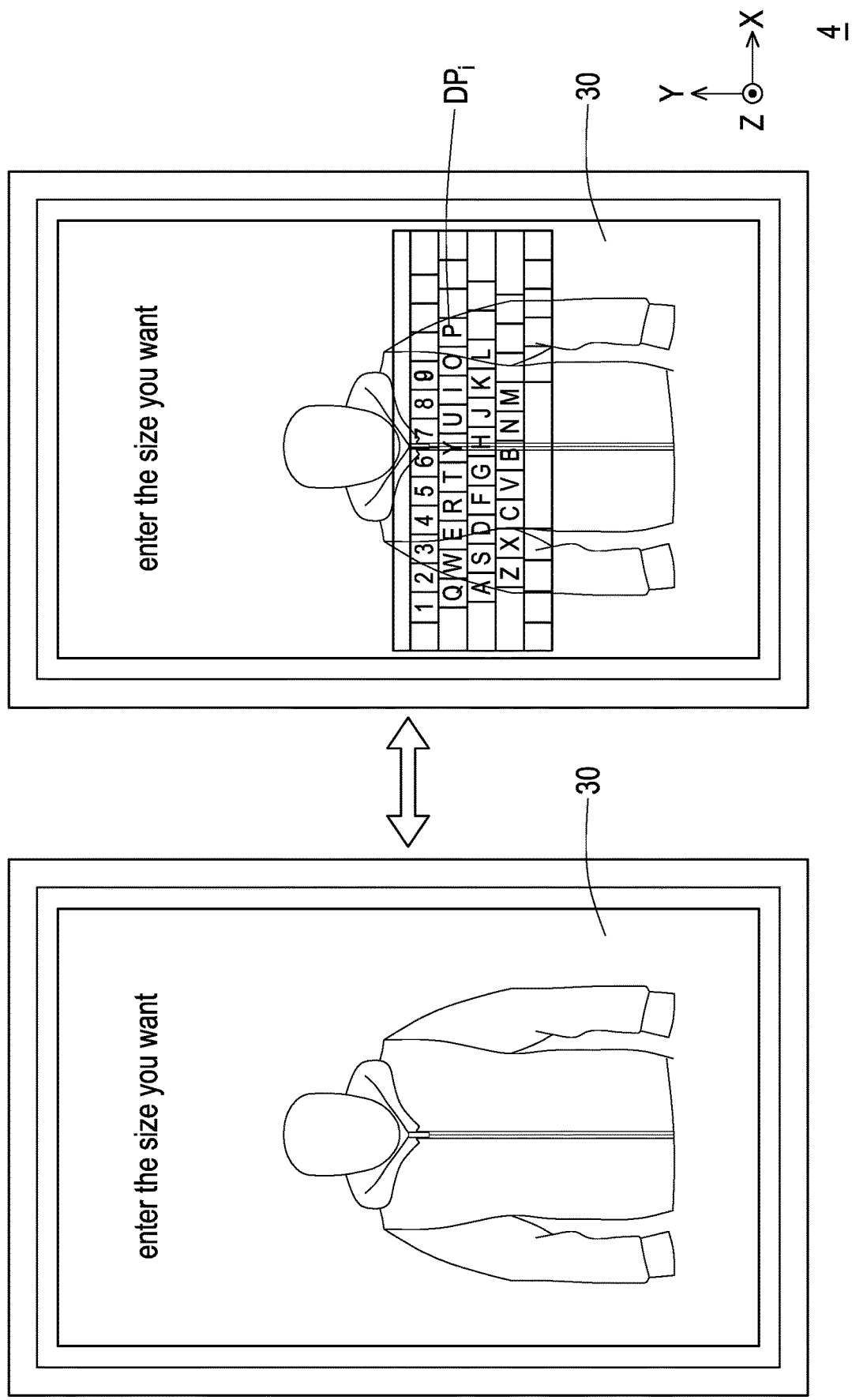
FIG. 5C is a schematic diagram illustrating a display device according to an embodiment of the disclosure.

It should be noted that, compared to the sub-electrodes of the display device 3, one single sub-electrode 201 of the display device 4 may serve to drive the cholesteric liquid crystal patterns DPi. For instance, in FIG. 5A, the cholesteric liquid crystal patterns DPi (numbers 1, 2, 3, 4, 5, 6, 7, 8, 9, and 0) are driven by the same sub-electrode 201. Similarly, the cholesteric liquid crystal patterns DPi (English letters A, S, D, F, G, H, J, K, and L) are driven by the same sub-electrode 201. The main reason why one single sub-electrode 201 of the display device 4 may be configured to simultaneously drive the cholesteric liquid crystal patterns DPi is that, by applying the above-mentioned mutual capacitance sensing method, the display device 4 may determine which cholesteric liquid crystal pattern DPi the user has selected based on 4×10 data. This allows the display device 4, as compared to the display device 3, to provide more complex decorative patterns. As shown in FIG. 5C, the display device 4 may display more complex information by means of the cholesteric liquid crystal patterns DPi.

In other embodiments of the disclosure, note that the cholesteric liquid crystal patterns DPi may be further driven by the sub-electrodes 202, or parts of the cholesteric liquid crystal patterns DPi are driven by some sub-electrodes 201 and the remaining cholesteric liquid crystal patterns DPi are driven by some sub-electrodes 202, which should however not be construed as a limitation to the configuration depicted in FIG. 5A.

Figure 5D:
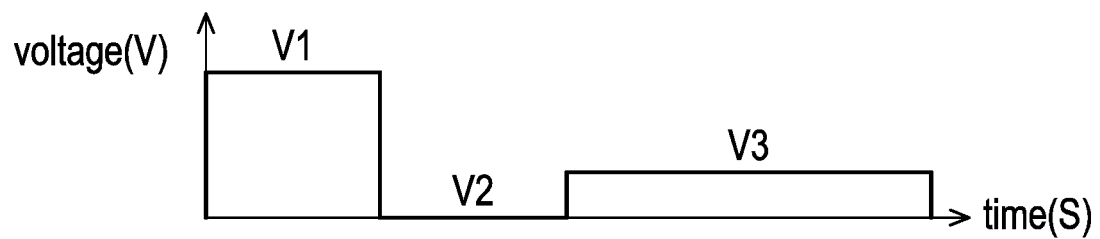
FIG. 5D is a schematic diagram illustrating a driving voltage of a display device according to an embodiment of the disclosure.
Figure 5E:
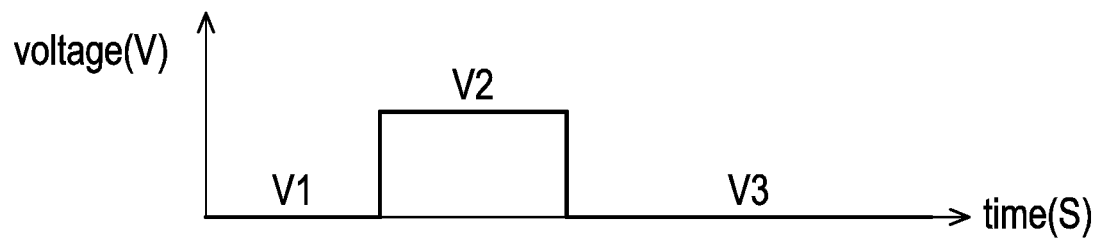
FIG. 5E is a schematic diagram illustrating a driving voltage of a display device according to an embodiment of the disclosure.

With reference to FIG. 5C, FIG. 5D, and FIG. 5E, when the display device 4 is to switch from a state without a decorative pattern (as shown in the left image of FIG. 5C) to a state with a decorative pattern (as shown in the right image of FIG. 5C), the voltage values applied to the sub-electrodes 201 may be shown as in FIG. 5D. Specifically, in the first stage, a high voltage V1 (for instance, 30V-50V) is applied to make the cholesteric liquid crystal molecules to be in a temporary state (a homeotropic state); in the second stage, a low voltage V2 (for instance, 0V) is applied to make the cholesteric liquid crystal molecules to be in a planar state to display the decorative pattern; and in the third stage, a low voltage V3 (for instance, 5V-10V) is applied to maintain the cholesteric liquid crystal molecules in the planar state, and the upper transparent electrode layer 200 may provide a touch function.

By contrast, when the display device 4 is to switch from a state with a decorative pattern (as shown in the right image of FIG. 5C) to a state without a decorative pattern (as shown in the left image of FIG. 5C), the voltage values applied to the sub-electrodes 201 may be shown as in FIG. 5E. Specifically, in the first stage, the cholesteric liquid crystal molecules are in a planar state, and the voltage V1 applied to the sub-electrode 201 is 0V; in the second stage, a higher voltage V2 (for instance, 15V-20V) is applied; and in the third stage, the voltage V3 applied to the sub-electrode 201 is reduced to 0V to maintain the cholesteric liquid crystal molecules to be in a focal conic state.

In view of the above, the display device provided in one or more embodiments of the disclosure defines the cholesteric liquid crystal patterns by the transparent photoresist structures and drives the cholesteric liquid crystal patterns by the sub-electrodes of the transparent electrode layers. The cholesteric liquid crystal layer has the simple structure and does not require any complex array structure, and it is likely to switch the presence or absence of the decorative patterns. Compared to the conventional display device which is able to switch the presence or absence of the decorative patterns, the display device provided in this embodiment is characterized by its cost-effectiveness and environmentally friendly design.

FIG. 6A to FIG. 6F are schematic cross-sectional diagrams illustrating a manufacturing process of a display device according to an embodiment of the disclosure.

With reference to FIG. 6, firstly, a first substrate 110 is provided. The first substrate 110 is transparent. For instance, in this embodiment, a material of the first substrate 110 may include glass, quartz, an organic polymer, or any other appropriate material, which should however not be construed as a limitation in the disclosure.

Next, a first transparent conductive layer 120 and a first transparent structure 130 are formed on the first substrate 110. The first transparent conductive layer 120 and the first transparent structure 130 are disposed on the first substrate 110. In this embodiment, optionally, the first transparent conductive layer 120 may be formed on the first substrate 110 first, and then the first transparent structure 130 may be formed on the first transparent conductive layer 120. However, this should not be construed as a limitation in the disclosure; in other embodiments, the first transparent structure 130 may be formed on the first substrate 110 first, and then the first transparent conductive layer 120 may be formed on the first substrate 110 and the first transparent structure 130.

In this embodiment, the first transparent conductive layer 120 is a conductive pattern covering the entire surface. For instance, in this embodiment, a material of the first transparent conductive layer 120 may include metal oxide, such as indium tin oxide, indium zinc oxide, aluminum tin oxide, aluminum zinc oxide, indium gallium zinc oxide, any other appropriate oxide, or a stacked layer of at least two of the above materials, which should however not be construed as a limitation in the disclosure. In this embodiment, the first transparent structure 130 may be formed by sequentially performing inkjet printing and curing processes; a height H130 and a shape of the first transparent structure 130 may be determined by manufacturing conditions of the inkjet printing process and should not be construed as limitations in the disclosure. The first transparent structure 130 may be conductive or insulating. For instance, in this embodiment, the first transparent structure 130 may be insulating; a material of the first transparent structure 130 may include, but is not limited to, an organic material. However, this should not be construed as a limitation in the disclosure; in another embodiment, the first transparent structure 130 may also be conductive; a material of the first transparent structure 130 may include, but is not limited to, indium tin oxide.

Next, a barrier wall 140 is formed on the first substrate 110, where the barrier wall 140 is disposed around the first transparent structure 130 and defines a first accommodation space 140a. In this embodiment, the barrier wall 140 may be a sealant with viscosity or a bank without viscosity, which should however not be construed as a limitation in the disclosure.

Figure 6A:
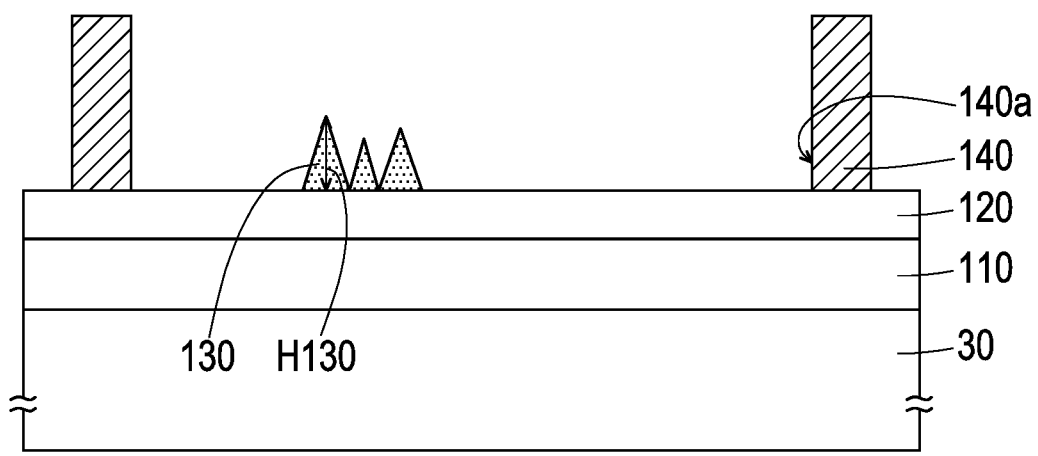
FIG. 6A to FIG. 6F are schematic cross-sectional diagrams illustrating a manufacturing process of a display device according to an embodiment of the disclosure.
Figure 6B:
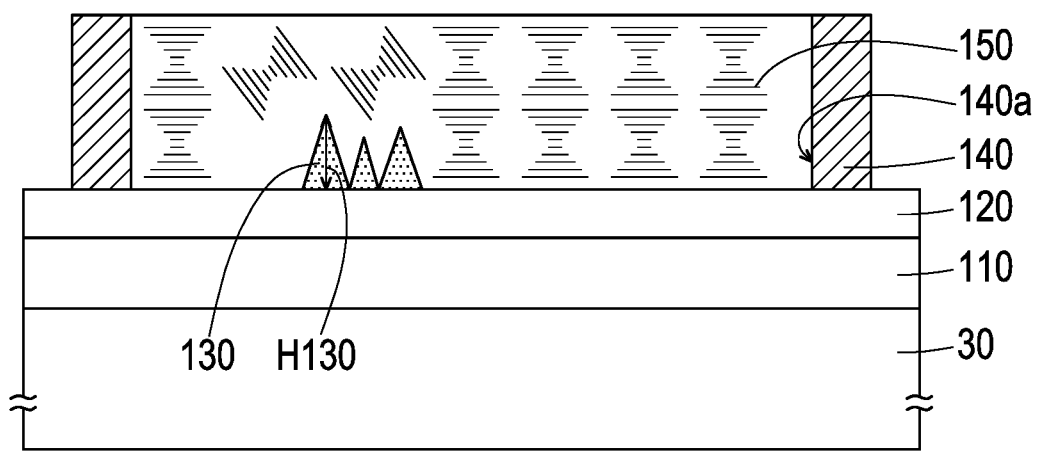

With reference to FIG. 6B, next, a first cholesteric liquid crystal layer 150 is formed in the first accommodation space 140a. The first cholesteric liquid crystal layer 150 is disposed on the first transparent conductive layer 120 and the first transparent structure 130. For instance, in this embodiment, an inkjet printing process may be performed to form the first cholesteric liquid crystal layer 150 in the first accommodation space 140a, which should however not be construed as a limitation in the disclosure.

Figure 6C:
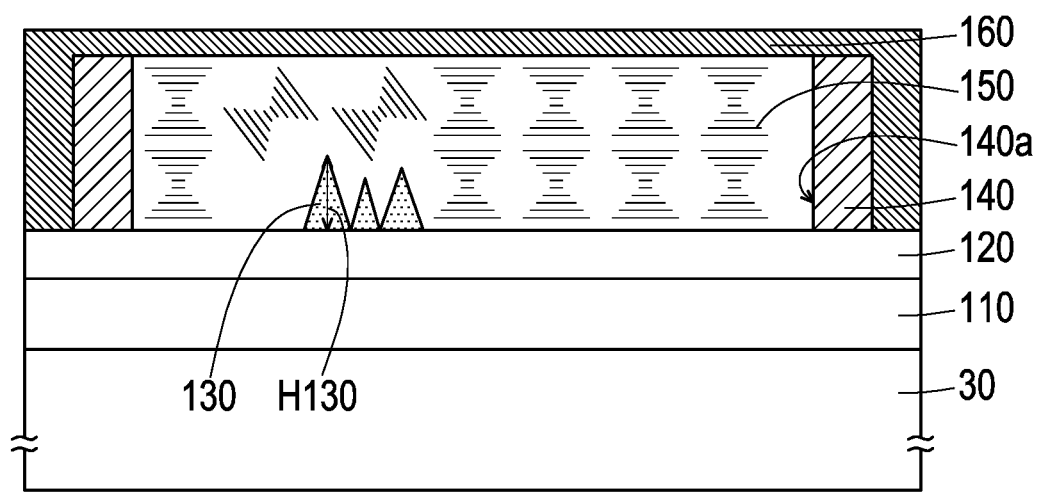

With reference to FIG. 6C, subsequently, a partition layer 160 is formed on the barrier wall 140 and the first cholesteric liquid crystal layer 150 to seal the first cholesteric liquid crystal layer 150 in the first accommodation space 140a. The partition layer 160 is disposed on the barrier wall 140 and the first cholesteric liquid crystal layer 150. The partition layer 160 is transparent. For instance, in this embodiment, an inkjet printing process may be performed to form a polymer material layer on the barrier wall 140 and the first cholesteric liquid crystal layer 150, and the polymer material layer is then cured to form the partition layer 160, which should however not be construed as a limitation in the disclosure. In this embodiment, a material of the partition layer 160 includes, for instance, polyvinyl alcohol (PVA), polyacrylic acid, or any other appropriate material, which should however not be construed as a limitation in the disclosure.

Figure 6D:
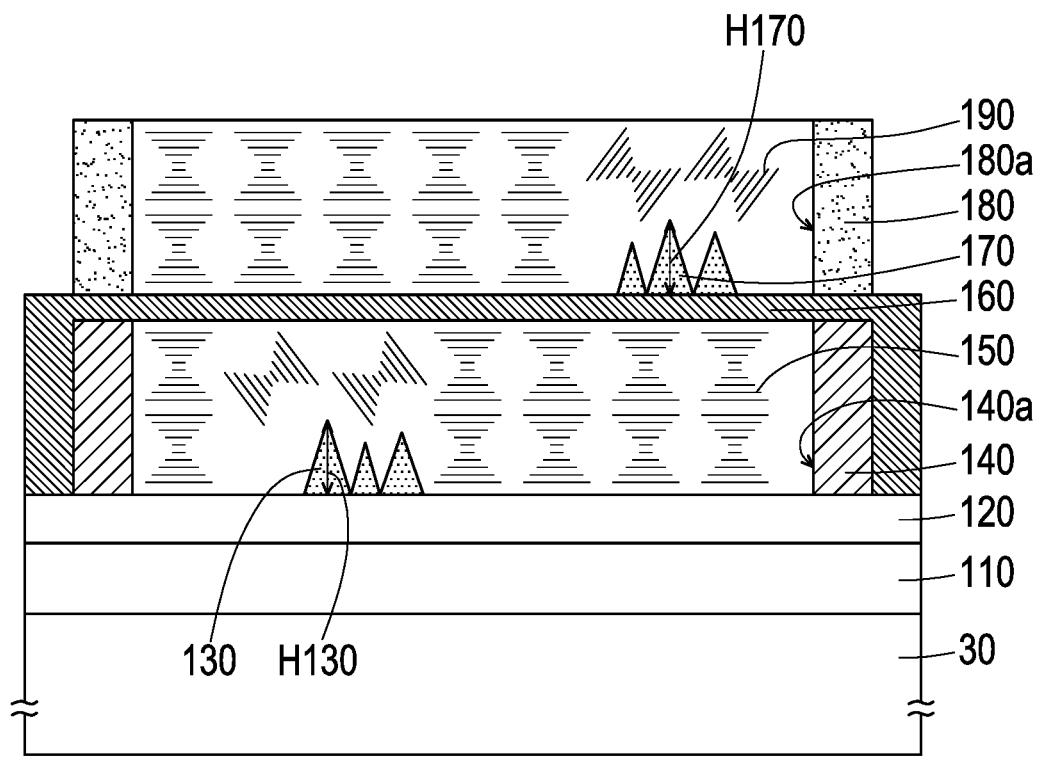

With reference to FIG. 6D, next, in this embodiment, a second transparent structure 170 may be optionally formed on the partition layer 160. The first transparent structure 130 and the second transparent structure 170 may be partially overlapped or alternately arranged. In this embodiment, the second transparent structure 170 may be formed by sequentially performing the inkjet printing and curing processes; a height H170 and a shape of the second transparent structure 170 may be determined by manufacturing conditions of the inkjet printing process according to actual needs, which should however not be construed as a limitation in the disclosure. The second transparent structure 170 may be conductive or insulating. For instance, in this embodiment, the second transparent structure 170 may be insulating; a material of the second transparent structure 170 may include, for instance but is not limited to, organic materials. However, this should not be construed as a limitation in the disclosure; in another embodiment, the second transparent structure 170 may also be conductive; a material of the second transparent structure 170 may include, for instance but is not limited to, indium tin oxide.

Next, a sealant 180 is formed on the partition layer 160, where the sealant 180 is disposed around the second transparent structure 170 and defines a second accommodation space 180a.

A second cholesteric liquid crystal layer 190 is then formed in the second accommodation space 180a. The second cholesteric liquid crystal layer 190 is disposed on the partition layer 160. For instance, in this embodiment, an inkjet printing process may be performed to form the second cholesteric liquid crystal layer 190 within the second accommodation space 180a, which should however not be construed as a limitation in the disclosure.

Figure 6E:
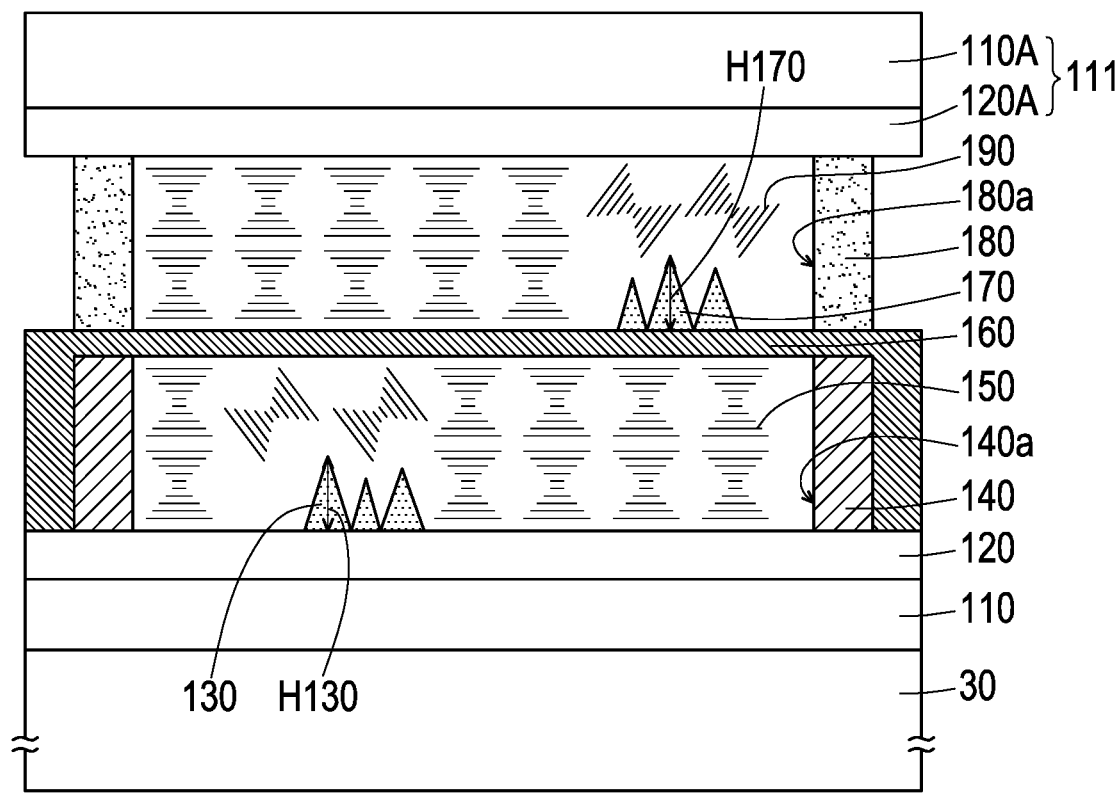

With reference to FIG. 6E, next, an opposite substrate 111 is provided. The opposite substrate 111 includes a second substrate 110A and a second transparent conductive layer 120A disposed on the second substrate 110A. The second substrate 110A is transparent. For instance, in this embodiment, a material of the second substrate 110A may include glass, quartz, an organic polymer, or any other appropriate material; a material of the second transparent conductive layer 120A may include metal oxide, such as indium tin oxide, indium zinc oxide, aluminum tin oxide, aluminum zinc oxide, indium gallium zinc oxide, any other appropriate oxide, or a stacked layer of at least two of the above materials, which should however not be construed as a limitation in the disclosure.

Next, the opposite substrate 111 is applied to encapsulate the second cholesteric liquid crystal layer 190. After the encapsulation is completed, the second substrate 110A is disposed on the second cholesteric liquid crystal layer 190, and the second transparent conductive layer 120A is disposed between the second substrate 110A and the second cholesteric liquid crystal layer 190. Here, a decorative panel DP0 is completely formed. The decorative panel DP0 includes the first substrate 110, the first transparent conductive layer 120, the first transparent structure 130, the barrier wall 140, the first cholesteric liquid crystal layer 150, the partition layer 160, the second transparent structure 170, the sealant 180, the second cholesteric liquid crystal layer 190, and the opposite substrate 111.

Figure 6F:
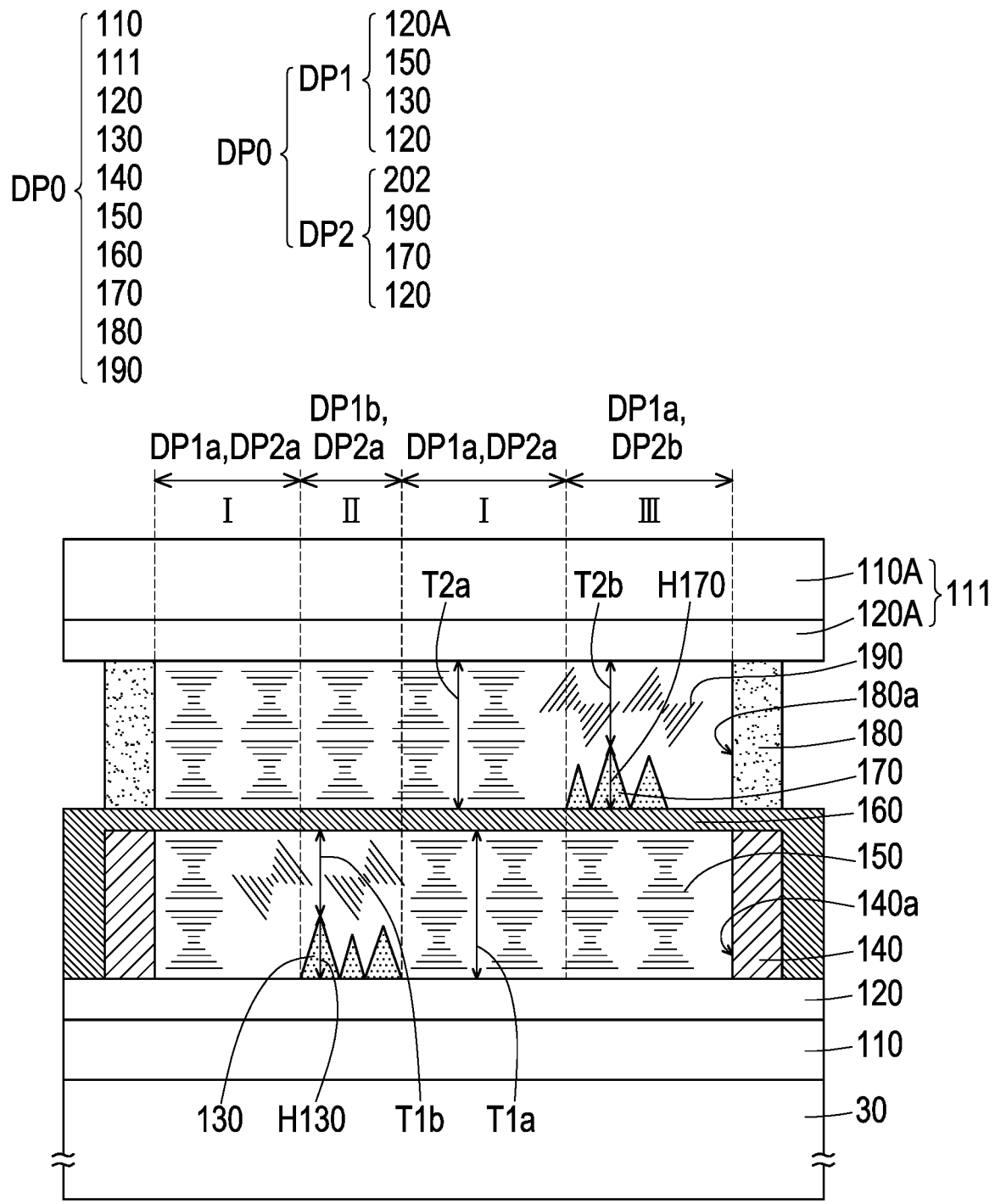

With reference to FIG. 6F, next, in this embodiment, the decorative panel DP0 and the display panel 30 may be optionally assembled, where the display panel 30 is disposed behind the decorative panel DP0. Here, a display device 5 provided in this embodiment is completely formed. The display device 5 provided in this embodiment has both decorative and display functions. In this embodiment, the display panel 30 may be a self-luminous display panel, such as a micro light emitting diode (LED) display panel, an organic light emitting diode (OLED) display panel, and so on, or the display panel 30 may be a non-self-luminous display panel, e.g., a liquid crystal display (LCD) panel or the like, which should however not be construed as a limitation in the disclosure.

With reference to FIG. 6F, the decorative panel DP0 includes a first portion DP1 and a second portion DP2. The first portion DP1 at least includes the first cholesteric liquid crystal layer 150 and the first transparent structure 130. The second portion DP2 at least includes the second cholesteric liquid crystal layer 190 and the second transparent structure 170. Both the first portion DP1 and the second portion DP2 include a first transparent conductive layer 120 and the second transparent conductive layer 120A. The first portion DP1 and the second portion DP2 share the first transparent conductive layer 120 and the second transparent conductive layer 120A.

Figure 9:
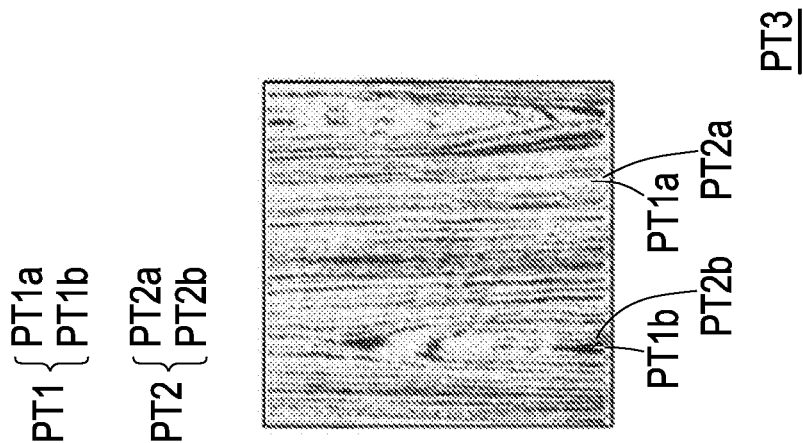
FIG. 9 is a schematic diagram illustrating a decorative pattern according to an embodiment of the disclosure.
Figure 8:
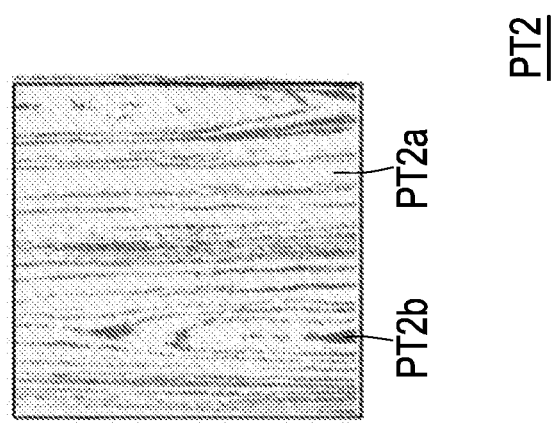
FIG. 8 is a schematic diagram illustrating a second decorative pattern according to an embodiment of the disclosure.
Figure 7:
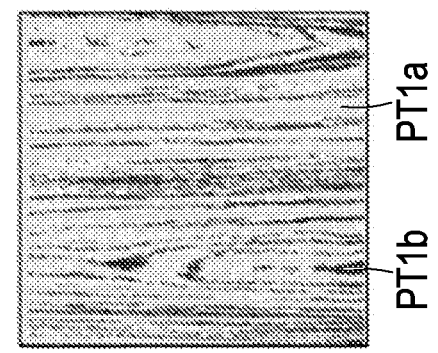
FIG. 7 is a schematic diagram illustrating a first decorative pattern according to an embodiment of the disclosure.

FIG. 7 is a schematic diagram illustrating a first decorative pattern according to an embodiment of the disclosure. FIG. 8 is a schematic diagram illustrating a second decorative pattern according to an embodiment of the disclosure. FIG. 9 is a schematic diagram illustrating a decorative pattern according to an embodiment of the disclosure.

With reference to FIG. 6F, FIG. 7, FIG. 8, and FIG. 9, the display device 5 may switch between a display mode and a decorative mode. When the display device 5 is in the decorative mode, the display device 5 may present a decorative pattern PT (shown in FIG. 9). Specifically, the decorative pattern PT is superimposed by the first decorative pattern PT1 provided by the first portion DP1 of the decorative panel DP0 and the second decorative pattern PT2 provided by the second portion DP2 of the decorative panel DP0. The mechanism of presenting the decorative pattern PT is explained below with reference to FIG. 6F, FIG. 7, FIG. 8, and FIG. 9.

With reference to FIG. 6F and FIG. 7, when the display device 5 is in the decorative mode, the decorative panel DP0 is not enabled (i.e., the potential difference between the first transparent conductive layer 120 and the second transparent conductive layer 120A is substantially 0), the first cholesteric liquid crystal layer 150 is in a reflective state (or in other words, in a planar state), and the first portion DP1 of the decorative panel DP0 presents the first decorative pattern PT1. Specifically, the first decorative pattern PT1 presented by the first portion DP1 of the decorative panel DP0 corresponds to the first transparent structure 130. In this embodiment, the first decorative pattern PT1 is substantially overlapped with the first transparent structure 130. That is, in a top view of the display device 5, the pattern of the first decorative pattern PT1 roughly matches the location of the first transparent structure 130.

A first area DP1a of the first portion DP1 of the decorative panel DP0 does not include the first transparent structure 130. A second area DP1b of the first portion DP1 of the decorative panel DP0 includes the first transparent structure 130. A thickness T1a of the first cholesteric liquid crystal layer 150 in the first area DP1a is greater than a thickness T1b of the first cholesteric liquid crystal layer 150 in the second area DP1b.

When the display device 5 is in the decorative mode, the decorative panel DP0 is not enabled, and the first cholesteric liquid crystal layer 150 is in a reflective state (or a planar state). At this time, the thickness T1a of the first cholesteric liquid crystal layer 150 in the first area DP1a is thicker, a reflectivity of the first area DP1a is higher, and the first area DP1a tends to present a color that the first part DP1 of the decorative panel DP0 intends to reflect. The thickness T1b of the first cholesteric liquid crystal layer 150 in the second area DP1b is thinner, a reflectivity of the second area DP1b is lower (i.e., the transmittance is higher), and the second area DP1b tends to present a color of the display panel 30 behind the decorative panel DP0. As such, the first part DP1 of the decorative panel DP0 may present the first decorative pattern PT1.

With reference to FIG. 6F and FIG. 8, when the display device 5 is in the decorative mode, the decorative panel DP0 is not enabled (that is, the potential difference between the first transparent conductive layer 120 and the second transparent conductive layer 120A is substantially 0), the second cholesteric liquid crystal layer 190 is in a reflective state (or a planar state), and the second part DP2 of the decorative panel DP0 presents the second decorative pattern PT2. Specifically, the second decorative pattern PT2 presented by the second part DP2 of the decorative panel DP0 corresponds to the second transparent structure 170. In this embodiment, the second decorative pattern PT2 is substantially overlapped with the second transparent structure 170. That is, in the top view of the display device 5, the pattern of the second decorative pattern PT2 roughly matches the location of the second transparent structure 170.

A first area DP2a of the second part DP2 of the decorative panel DP0 does not include the second transparent structure

170. A second area DP2*b* of the second part DP2 of the decorative panel DP0 includes the second transparent structure 170. A thickness T2*a* of the second cholesteric liquid crystal layer 190 in the first area DP2*a* is greater than a thickness T2*b* of the second cholesteric liquid crystal layer 190 in the second area DP2*b*.

When the display device 5 is in the decorative mode, the decorative panel DP0 is not enabled, and the second cholesteric liquid crystal layer 190 is in a reflective state (or a planar state). At this time, the thickness T2*a* of the second cholesteric liquid crystal layer 190 in the first area DP2*a* is thicker, a reflectivity of the first area DP2*a* is higher, and the first area DP2*a* tends to present a color that the second part DP2 of the decorative panel DP0 intends to reflect. The thickness T2*b* of the second cholesteric liquid crystal layer 190 in the second area DP2*b* is thinner, a reflectivity of the second area DP2*b* is lower (i.e., the transmittance is higher), and the second area DP2*b* tends to present a color of the display panel 30 behind the decorative panel DP0. As such, the second part DP2 of the decorative panel DP0 may present the second decorative pattern PT2.

When the display device 5 is in the decorative mode, the first portion DP1 and the second portion DP2 of the decorative panel DP0 respectively present the first decorative pattern PT1 and the second decorative pattern PT2. The first decorative pattern PT1 and the second decorative pattern PT2 may be superimposed to form a decorative pattern PT with more diverse content/colors, thus enhancing the decorative effect of the display device 5 to another level.

With reference to FIG. 6F, in this embodiment, a pitch of the first cholesteric liquid crystal layer 150 and a pitch of the second cholesteric liquid crystal layer 190 may be different, and colors predetermined to be reflected by the first portion DP1 and the second portion DP2 of the decorative panel DP0 may be different. For instance, in this embodiment, the colors predetermined to be reflected by the first portion DP1 and the second portion DP2 of the decorative panel DP0 may be red and green, respectively.

With reference to FIG. 6F and FIG. 7, in this embodiment, when the display device 5 is in the decorative mode, the display panel 30 may be optionally disabled and present a black color. At this time, for instance, the first area DP1*a* of the first portion DP1 of the decorative panel DP0 may present a light red color, and the second area DP1*b* of the first portion DP1 of the decorative panel DP0 may present a dark red color, which is a mixture of the red color reflected by the first cholesteric liquid crystal layer 150 in the second area DP1*b* and the black color provided by the disabled display panel 30 behind the first cholesteric liquid crystal layer 150.

In this embodiment, the first area DP1*a* of the first portion DP1 of the decorative panel DP0 may correspond to a light red wooden area PT1*a* of the first decorative pattern PT1, the second area DP1*b* of the first portion DP1 of the decorative panel DP0 may correspond to a dark red wooden area PT1*b* of the first decorative pattern PT1, and the entire first decorative pattern PT1 may present a red cross-section of original wood.

With reference to FIG. 6F and FIG. 8, when the display device 5 is in the decorative mode, the first area DP2*a* of the second portion DP2 of the decorative panel DP0 presents a light green color, and the second area DP2*b* of the second portion DP2 of the decorative panel DP0 presents a dark green color, which is a mixture of the green color reflected by the second cholesteric liquid crystal layer 190 in the second area DP2*b* and the black color provided by the disabled display panel 30 behind the second cholesteric liquid crystal layer 190.

In this embodiment, the first area DP2*a* of the second portion DP2 of the decorative panel DP0 may correspond to a light green wooden area PT2*a* of the second decorative pattern PT2, the second area DP2*b* of the second portion DP2 of the decorative panel DP0 may correspond to a dark green wooden area PT2*b* of the second decorative pattern PT2, and the entire second decorative pattern PT2 presents a green cross-section of original wood.

In this embodiment, a distribution manner of the first transparent structure 130 may be optionally the same as that of the second transparent structure 170, and the first transparent structure 130 and the second transparent structure 170 are slightly arranged alternately. Specifically, in this embodiment, the first decorative pattern PT1 corresponding to the first transparent structure 130 may be a red cross-section of original wood, and the second decorative pattern PT2 corresponding to the second transparent structure 170 may be a green cross-section of original wood, where the wood pattern of the red cross-section and the wood pattern of the green cross-section lightly arranged alternately, and the decorative pattern PT formed by superimposing the first decorative pattern PT1 and the second decorative pattern PT2 may present a more layered, shadow-like cross-section of original wood.

However, the disclosure is not limited to what is described above. In other embodiments of the disclosure, by changing the pattern of the first transparent structure 130 and/or the pitch of the first cholesteric liquid crystal layer 150, the shape and/or the color of the first decorative pattern PT1 may be changed. By changing the distribution manner of the second transparent structure 170 and/or the pitch of the second cholesteric liquid crystal layer 190, the shape and/or the color of the second decorative pattern PT2 may be changed, thereby superimposing the decorative patterns PT of more diverse shapes and/or colors.

With reference to FIG. 6F, in this embodiment, through the first portion DP1 and the second portion DP2 of the decorative panel DP0, the decorative panel DP0 may provide more than two colors. For instance, in this embodiment, the first area DP1*a* of the first portion DP1 of the decorative panel DP0 reflects a larger amount of red light, the second area DP1*b* of the first portion DP1 of the decorative panel DP0 reflects a smaller amount of red light, the first area DP2*a* of the second portion DP2 of the decorative panel DP0 reflects a larger amount of green light, and the second area DP2*b* of the second portion DP2 of the decorative panel DP0 reflects a smaller amount of green light. In an area I where the first area DP1*a* of the first portion DP1 and the first area DP2*a* of the second portion DP2 of the decorative panel DP0, a larger amount of red light and a larger amount of green light are reflected and mixed into a first color light. In an area II where the second area DP1*b* of the first portion DP1 and the first area DP2*a* of the second portion DP2 of the decorative panel DP0 are overlapped, a smaller amount of red light and a larger amount of green light are reflected and mixed into a second color light. In an area III where the first area DP1*a* of the first portion DP1 and the second area DP2*b* of the second portion DP2 of the decorative panel DP0 are overlapped, a larger amount of red light and a smaller amount of green light are reflected and mixed into a third color light.

With reference to FIG. 6F, on the other hand, the display device 5 may switch not only to the above-mentioned decorative mode but also to the display mode. When the display device 5 is in the display mode, the decorative panel DP0 is enabled (i.e., the potential difference between the first transparent conductive layer 120 and the second transparent conductive layer 120A is substantially greater than 0), and the first cholesteric liquid crystal layer 150 and the second cholesteric liquid crystal layer 190 are in a transparent state. At this time, a display light beam emitted by the display panel 30 passes through the decorative panel DP0 and transmits display information carried by the display light beam to eyes of the user. In this embodiment, the transparent state may refer to the focal conical state or the homeotropic state, which should however not be construed as a limitation in the disclosure.

It is worth mentioning that by using the decorative panel DP0, which includes the first transparent structure 130 and the second transparent structure 170, the display device 5 may not only present the decorative pattern PT in the decorative mode but also present the display information of the display panel 30 in the display mode according to the user's choice without presenting the decorative pattern PT. In other words, through the integration of the switchable decorative panel DP0, the functions of the display device 5 may be more diverse. More importantly, the first portion DP1 and the second portion DP2 of the decorative panel DP0, which respectively have the first transparent structure 130 and the second transparent structure 170, may provide the first decorative pattern PT1 and the second decorative pattern PT2. The first decorative pattern PT1 and the second decorative pattern PT2 may form a decorative pattern PT with more diverse content and/or colors, thereby elevating the decorative effect of the display device 5 to another level.

Besides, in this embodiment, the first portion DP1 and the second portion DP2 of the decorative panel DP0 share the same set of transparent electrodes (i.e., the first transparent conductive layer 120 and the second transparent conductive layer 120A). That is, the first portion DP1 and the second portion DP2 of the decorative panel DP0 are integrated within the same cell formed by the first substrate 110 and the second substrate 110A, which has the advantages of simple manufacturing process and thin thickness.

It should be noted that the reference numbers and some content of the previous embodiments are used in the following embodiments, where the same reference numbers serve to represent the same or similar components, and the description of the same technical content is omitted. For the description of the omitted parts, please refer to the previous embodiments, and the description of the omitted parts will not be redundantly repeated in the following embodiments.

Figure 10:
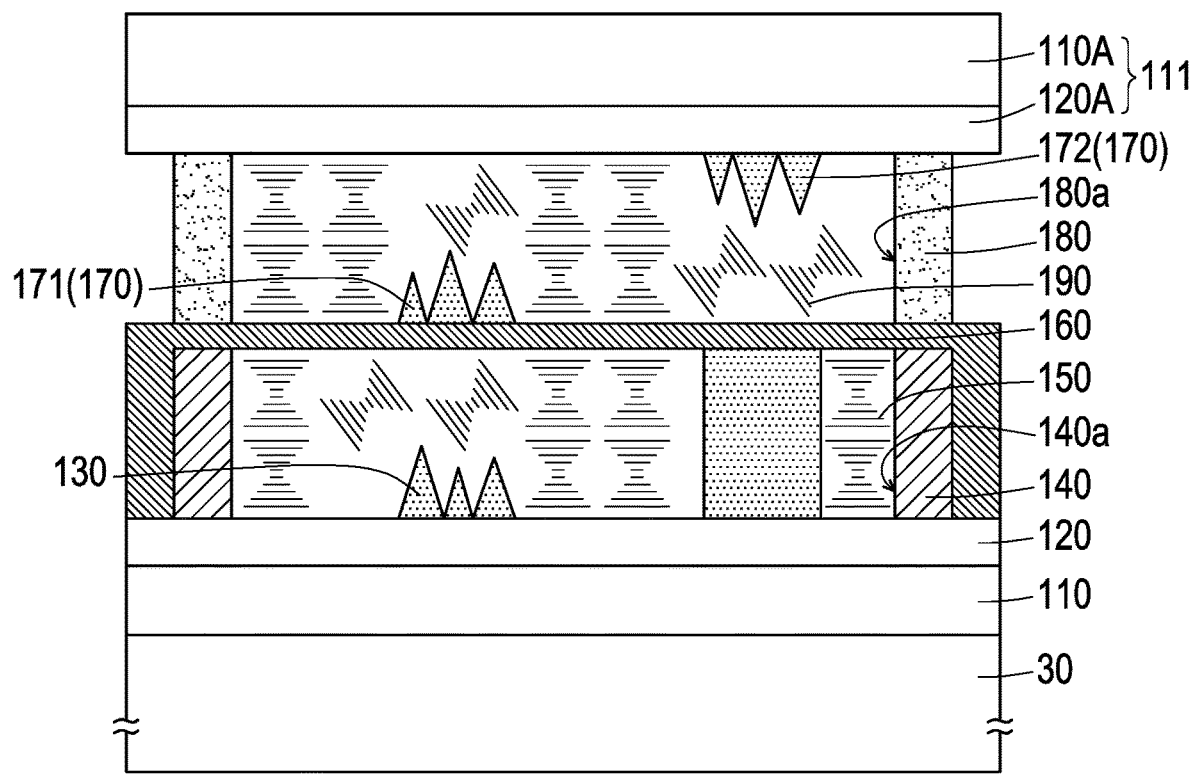
FIG. 10 is a schematic cross-sectional diagram illustrating a display device according to another embodiment of the disclosure.

FIG. 10 is a schematic cross-sectional diagram illustrating a display device according to another embodiment of the disclosure. A display device 10A in FIG. 10 is similar to the display device 5 in FIG. 6F, while the difference between the two lies in the different locations where the second transparent structure 170 is formed in these two display devices.

Specifically, in the embodiment depicted in FIG. 6F, the second transparent structure 170 is disposed on the partition layer 160; in the embodiment depicted in FIG. 10, the second transparent structure 170 may include a first portion 171 and a second portion 172, which are respectively disposed on the partition layer 160 and the second substrate 110A. The disclosure does not pose any limitation that the second transparent structure 170 is simply formed on the partition layer 160, nor does it limit that the second transparent structure 170 is required be formed on the partition layer 160 and the second substrate 110A. In another embodiment, the second transparent structure 170 may be disposed on the second substrate 110A without being disposed on the partition layer 160.

Figure 11A:
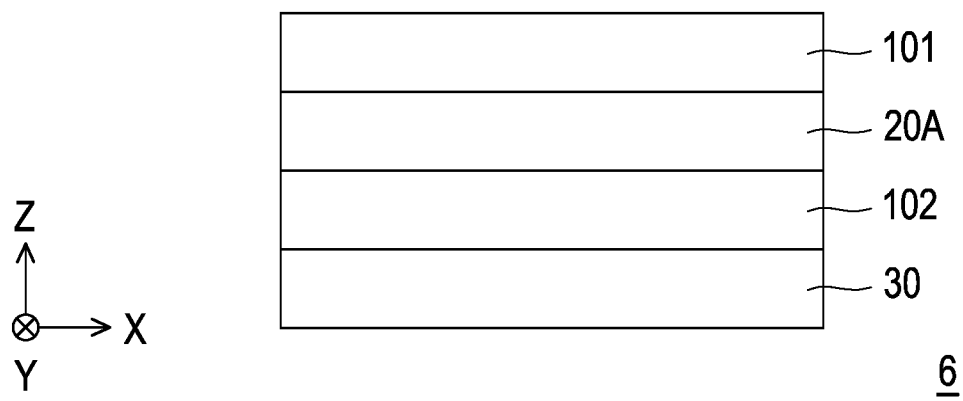
FIG. 11A is a schematic diagram illustrating a display device according to an embodiment of the disclosure.
Figure 11B:
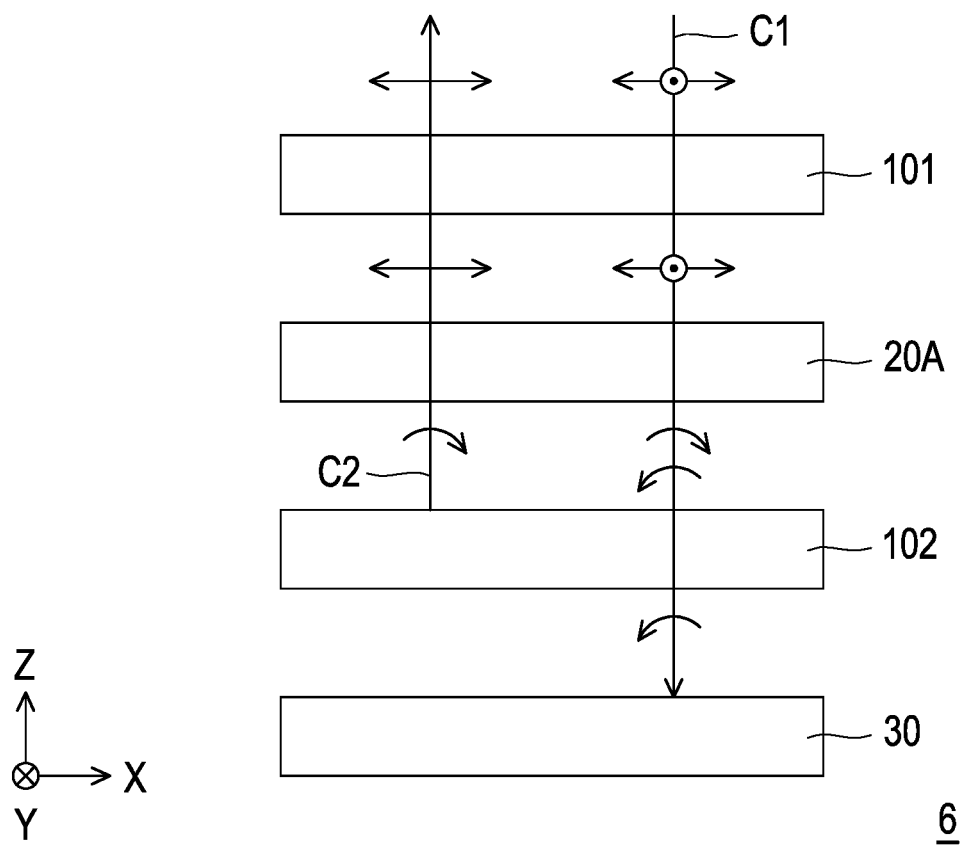
FIG. 11B is a schematic diagram illustrating an optical mechanism of the display device in FIG. 11A.
Figure 11C:
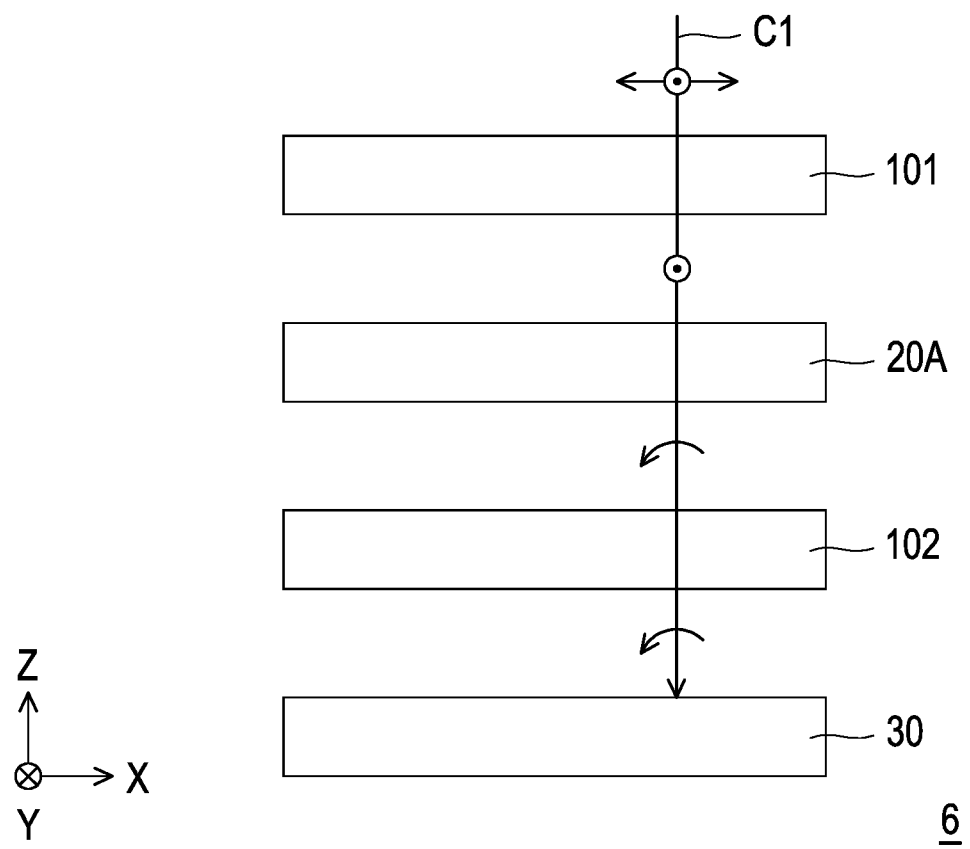
FIG. 11C is a schematic diagram illustrating the optical mechanism of the display device in FIG. 11A.

With reference to FIG. 11A to FIG. 11C, a display device 6 includes the display panel 30, the first cholesteric liquid crystal layer 102, a quarter-wave plate 20A, and a first switchable polarizing sheet 101, which are sequentially stacked. The first cholesteric liquid crystal layer 102 has a pattern and is configured to reflect a right-handed circularly polarized light. When the first switchable polarizing sheet 101 enables its polarization characteristics, the first switchable polarizing sheet 101 is a linear polarizing sheet and has a first absorption axis, and the first absorption axis is parallel to the X direction.

With reference to FIG. 11B, when the first switchable polarizing sheet 101 disables its polarization characteristics, an electric field of ambient light C1 in all directions without any specific polarization state may penetrate the first switchable polarizing sheet 101. Here, the electric field of the ambient light C1 is represented by a component in the X direction and a component in the Y direction, as shown in FIG. 11B. From another perspective, the ambient light C1 may be regarded as a combination of linearly polarized light in the X direction and linearly polarized light in the Y direction.

By appropriately configuring an optical axis direction of the quarter-wave plate 20A, the linearly polarized light in the X direction may be transformed into the right-handed circularly polarized light after passing through the quarter-wave plate 20A (in FIG. 11B and other subsequent diagrams, the right-handed circularly polarized light is represented by clockwise arrows), and the linearly polarized light in the Y direction may be transformed into left-handed circularly polarized light after passing through the quarter-wave plate 20A (in FIG. 11B and other subsequent diagrams, the left-handed circularly polarized light is represented by counterclockwise arrows).

Since the first cholesteric liquid crystal layer 102 is configured to reflect the right-handed circularly polarized light, the left-handed circularly polarized light in the ambient light C1 passes through the first cholesteric liquid crystal layer 102. In FIG. 11B, the right-handed circularly polarized light reflected by the first cholesteric liquid crystal layer 102 is marked as reflected pattern light C2. Specifically, the first cholesteric liquid crystal layer 102 has the cholesteric liquid crystal and the decorative pattern, e.g., a wood pattern. The cholesteric liquid crystal is a type of liquid crystal molecules characterized by Bragg reflection and bistable characteristics and may reflect incident light having a wavelength equivalent to the pitch of the cholesteric liquid crystal and having the same polarization properties, so as to present its decorative pattern. In this embodiment, the right-handed circularly polarized light may be reflected by the first cholesteric liquid crystal layer 102; therefore, the reflected pattern light C2 has the decorative pattern information of the first cholesteric liquid crystal layer 102. After passing through the quarter-wave plate 20A, the reflected pattern light C2 is transformed to the linearly polarized light in the X direction. The linearly polarized light in the X direction may pass through the first switchable polarizing sheet 101, thus making the decorative pattern of the first cholesteric liquid crystal layer 102 visible.

In an embodiment, when the display panel 30 in FIG. 11B is turned off, the user may merely observe the decorative pattern of the first cholesteric liquid crystal layer 102. In another embodiment, when the display panel 30 in FIG. 11B is turned on to provide a display image, the user may simultaneously observe the decorative pattern of the first cholesteric liquid crystal layer 102 and the display image of the display panel 30.

With reference to FIG. 11C, when the first switchable polarizing sheet 101 enables its polarization characteristics, since its first absorption axis is parallel to the X direction, only the linearly polarized light in the Y direction may pass through the first switchable polarizing sheet 101. The linearly polarized light in the Y direction is transformed to the left-handed circularly polarized light after passing through the quarter-wave plate 20A, and the left-handed circularly polarized light then passes through the first cholesteric liquid crystal layer 102, so that the user does not observe the decorative pattern of the first cholesteric liquid crystal layer 102.

In an embodiment, the display panel 30 in FIG. 11C is a self-luminous display panel, such as a micro LED display panel, an OLED display panel, or any other appropriate self-luminous display panel. When the display panel 30 is turned on, it outputs image light to provide a display image. The display panel 30 may increase the output brightness of the image light having the wavelength corresponding to the pitch of the cholesteric liquid crystal in the first cholesteric liquid crystal layer 102, so as to compensate for the part of the image light which has the above-mentioned wavelength and is reflected back to the display panel 30 by the first cholesteric liquid crystal layer 102 and further prevent color cast.

In the embodiments shown in FIG. 11A to FIG. 11C, the first cholesteric liquid crystal layer 102 is configured to reflect the right-handed circularly polarized light, and the first absorption axis of the first switchable polarizing sheet 101 is parallel to the X direction. However, this should not be construed as a limitation in the disclosure. In an embodiment, the first cholesteric liquid crystal layer 102 is configured to reflect the left-handed circularly polarized light, and the first absorption axis of the first switchable polarizing sheet 101 is parallel to the Y direction. In such a case, the reflected pattern light C2 in FIG. 11B is the left-handed circularly polarized light, which is transformed to the linearly polarized light in the Y direction after passing through the quarter-wave plate 20A, and the reflected pattern light C2 may further pass through the first switchable polarizing sheet 101, thus making the decorative pattern of the first cholesteric liquid crystal layer 102 visible. In FIG. 11C, the light passing through the first switchable polarizing sheet 101 is the linearly polarized light in the X direction, which is transformed to the right-handed circularly polarized light after passing through the quarter-wave plate 20A, and the light subsequently passes through the first cholesteric liquid crystal layer 102, thus making the decorative pattern of the first cholesteric liquid crystal layer 102 to be invisible.

In an embodiment, the first switchable polarizing sheet 101 includes liquid crystal molecules doped with dye. Through an electrical control, the polarization characteristics of the first switchable polarizing sheet 101 may be enabled or disabled, which should however not be construed as a limitation in the disclosure. It should be noted that in the related art, the polarization characteristics of the polarizing sheet may not be disabled, and thus it is necessary to add other components, such as electrically controlled liquid crystal components, so as to change the phase (the polarization state) of the light as a means to switch between whether the pattern of the cholesteric liquid crystal layer is visible or not, which however results in the excessive size of the display device. Since the polarization characteristics of the first switchable polarizing 101 in the embodiment of the disclosure may be enabled or disabled, the display device 6 may simply switch the pattern of the first cholesteric liquid crystal layer 102 to be visible or invisible in no need of adding a plurality of optical components, thus reducing the volume of the display device 6.

Figure 12A:
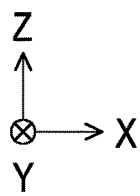
FIG. 12A is a schematic diagram illustrating a display device according to an embodiment of the disclosure.
Figure 12A:
Figure 12B:
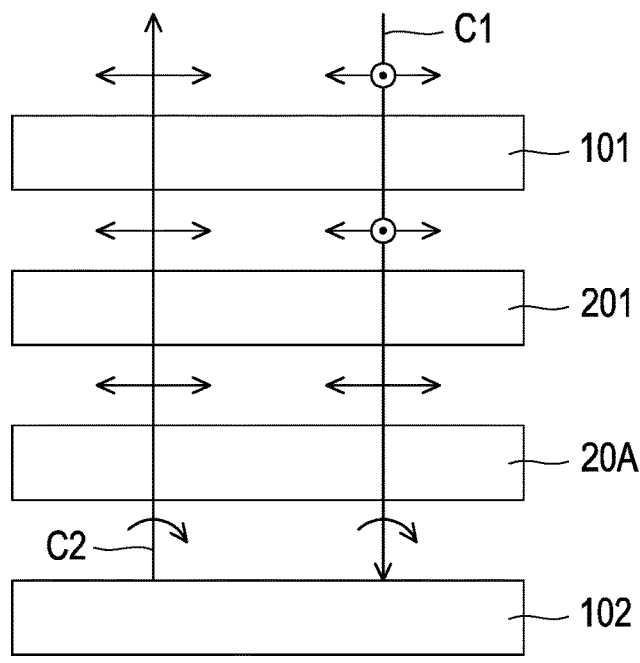
FIG. 12B is a schematic diagram illustrating an optical mechanism of the display device in FIG. 12A.
Figure 12B:
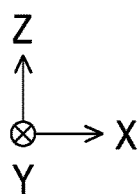
Figure 12B:
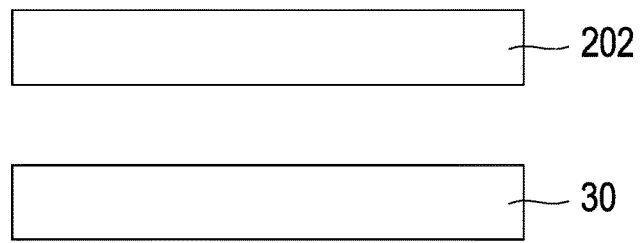
Figure 12C:
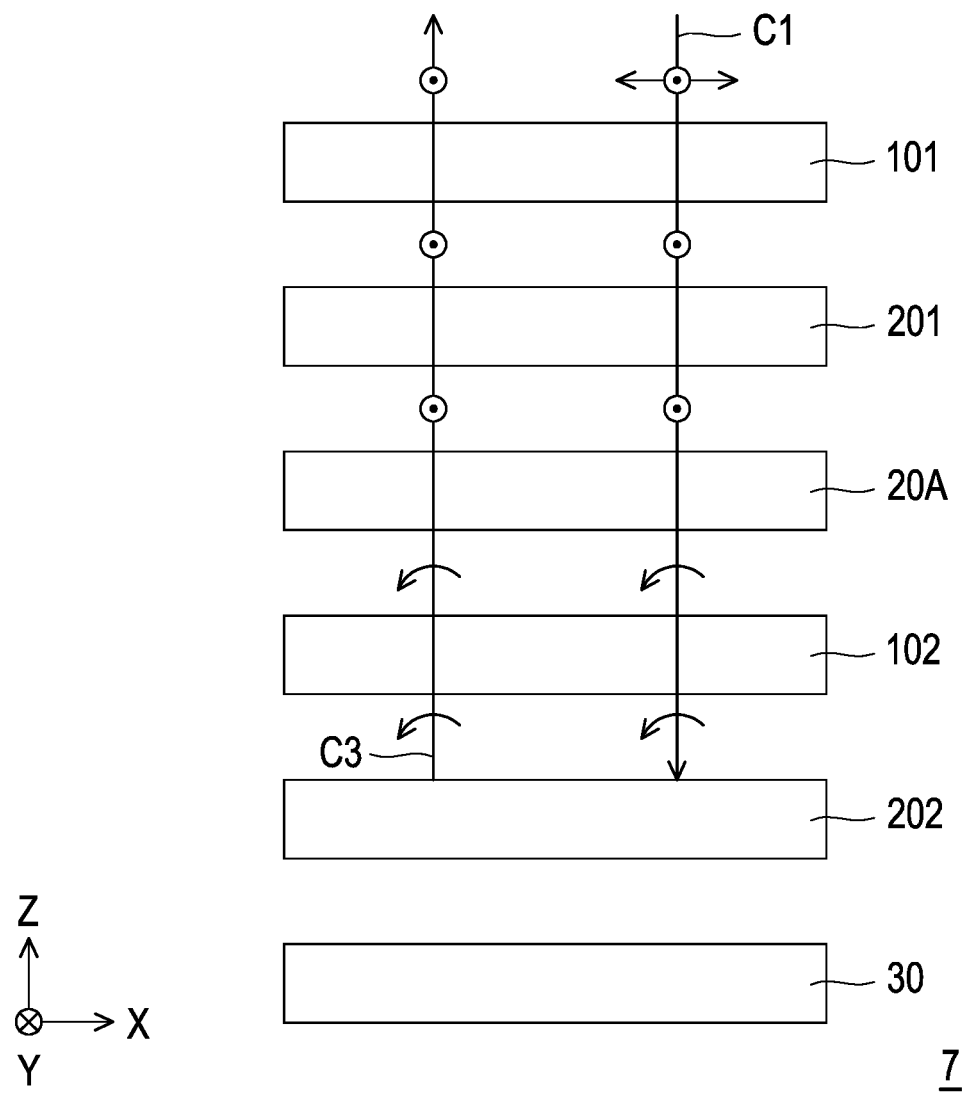
FIG. 12C is a schematic diagram illustrating the optical mechanism of the display device in FIG. 12A.

With reference to FIG. 12A to FIG. 12C, a display device 7 includes the display panel 30, the second cholesteric liquid crystal layer 202, the first cholesteric liquid crystal layer 102, the quarter-wave plate 20A, the second switchable polarizing sheet 201, and the first switchable polarizing sheet 101 which are sequentially stacked. As shown in FIG. 12A, the first cholesteric liquid crystal layer 102 and the second cholesteric liquid crystal layer 202 are disposed between the display panel 30 and the quarter-wave plate 20A, and the second switchable polarizing sheet 201 is disposed between the quarter-wave plate 20A and the first switchable polarizing sheet 101.

In this embodiment, the first cholesteric liquid crystal layer 102 has a pattern and is configured to reflect the right-handed circularly polarized light; the second cholesteric liquid crystal layer 202 also has a pattern, which is different from the pattern of the first cholesteric liquid crystal layer 102, and the second cholesteric liquid crystal layer 202 is configured to reflect the left-handed circularly polarized light. When the first switchable polarizing sheet 101 enables its polarization characteristics, the first switchable polarizing sheet 101 is a linear polarizing sheet and has a first absorption axis, the first absorption axis is parallel to the X direction; when the second switchable polarizing sheet 201 enables its polarization characteristics, the second switchable polarizing sheet 201 is a linear polarizing sheet and has a second absorption axis, and the second absorption axis is parallel to the Y direction.

With reference to FIG. 12B, in this embodiment, the first switchable polarizing sheet 101 disables its polarization characteristics, and the second switchable polarizing sheet 201 enables its polarization characteristics. The electric field of the ambient light C1 in all directions without any specific polarization state may penetrate the first switchable polarizing sheet 101, while only the linearly polarized light in the X direction may penetrate the second switchable polarizing sheet 201. The linearly polarized light in the X direction is transformed to the right-handed circularly polarized light after passing through the quarter-wave plate 20A. Since the right-handed circularly polarized light may be reflected by the first cholesteric liquid crystal layer 102, the reflected pattern light C2 has the decorative pattern information of the first cholesteric liquid crystal layer 102. The reflected pattern light C2 is transformed to the linearly polarized light in the X direction after passing through the quarter-wave plate 20A. The linearly polarized light in the X direction may sequentially penetrate the second switchable polarizing sheet 201 and the first switchable polarizing sheet 101, thus making the decorative pattern of the first cholesteric liquid crystal layer 102 visible and making the decorative pattern of the second cholesteric liquid crystal layer 202 invisible.

In an embodiment, when the display panel 30 in FIG. 12B is turned off, the user may simply observe the decorative pattern of the first cholesteric liquid crystal layer 102. In another embodiment, when the display panel 30 in FIG. 12B is turned on to provide a display image, the user may simultaneously observe the decorative pattern of the first cholesteric liquid crystal layer 102 and the display image of the display panel 30.

With reference to FIG. 12C, in this embodiment, the first switchable polarizing sheet 101 enables its polarization characteristics, and the second switchable polarizing sheet 201 disables its polarization characteristics. In the ambient light C1 without any specific polarization state, only the linearly polarized light in the Y direction may pass through the first switchable polarizing sheet 101 and subsequently pass through the second switchable polarizing sheet 201. The linearly polarized light in the Y direction is transformed to the left-handed circularly polarized light after passing through the quarter-wave plate 20A, and the left-handed circularly polarized light passes through the first cholesteric liquid crystal layer 102. Since the left-handed circularly polarized light may be reflected by the second cholesteric liquid crystal layer 202, the reflected pattern light C3 has the decorative pattern information of the second cholesteric liquid crystal layer 202. The reflected pattern light C3 may pass through the first cholesteric liquid crystal layer 102 and remain as the left-handed circularly polarized light. The left-handed circularly polarized light is transformed to the linearly polarized light in the Y direction after passing through the quarter-wave plate 20A. The linearly polarized light in the Y direction may sequentially pass through the second switchable polarizing sheet 201 and the first switchable polarizing sheet 101, thus making the decorative pattern of the second cholesteric liquid crystal layer 202 visible and making the decorative pattern of the first cholesteric liquid crystal layer 102 invisible.

In an embodiment, when the display panel 30 in FIG. 12C is turned off, the user may simply observe the decorative pattern of the second cholesteric liquid crystal layer 202. In another embodiment, when the display panel 30 in FIG. 12C is turned on to provide a display image, the user may simultaneously observe the decorative pattern of the second cholesteric liquid crystal layer 202 and the display image of the display panel 30.

In an embodiment, the display panel 30 is a self-luminous display panel, such as a micro LED display panel, an OLED display panel, or any other suitable self-luminous display panel. When the display panel 30 is turned on, the display panel 30 outputs the image light to provide the display image. The display panel 30 may increase the output brightness of the image light having the wavelength corresponding to the pitch of the cholesteric liquid crystal in the first cholesteric liquid crystal layer 102 and increase the output brightness of the image light having the wavelength corresponding to the pitch of the cholesteric liquid crystal in the second cholesteric liquid crystal layer 202, so as to compensate for the part of the image light which has the above-mentioned wavelength and is reflected back to the display panel 30 by the first cholesteric liquid crystal layer 102 and the second cholesteric liquid crystal layer 202 and further prevent color cast.

In an embodiment, both the first switchable polarizing sheet 101 and the second switchable polarizing sheet 201 include liquid crystal molecules doped with dye. Through an electric control, the polarization characteristics of the first switchable polarizing sheet 101 and the second switchable polarizing sheet 201 may be enabled or disabled, which should however not be construed as a limitation in the disclosure. It should be noted that in the related art, the polarization characteristics of the polarizing sheet may not be disabled, and thus it is necessary to add other components, such as electrically controlled liquid crystal components, so as to change the phase (the polarization state) of the light as a means to switch between whether the pattern of the cholesteric liquid crystal layer is visible or not, which however results in the excessive size of the display device. Since the polarization characteristics of the first switchable polarizing sheet 101 and the second switchable polarizing sheet 201 in the embodiment of the disclosure may be enabled or disabled, the display device 7 may simply switch to display the pattern of the first cholesteric liquid crystal layer 102 or the pattern of the second cholesteric liquid crystal layer 202 in no need of adding a plurality of optical components, thus reducing the volume of the display device 7.

To sum up, the display device provided in one or more embodiments of the disclosure changes the polarization state of light through the switchable polarizing sheets, thus allowing the display device to simply switch the pattern of the cholesteric liquid crystal to be visible or invisible or switch to display different decorative patterns. Compared to the situation where the polarization characteristics of the conventional polarizing sheet cannot be disabled, the optical components used to control the phase (the polarization state) may be omitted herein, so as to reduce the volume of the display device.

What is claimed is:

1. A display device, comprising a display panel, a lower substrate, a lower transparent electrode layer, a cholesteric liquid crystal layer, an upper transparent electrode layer, and an upper substrate which are sequentially stacked, wherein,
the cholesteric liquid crystal layer comprises cholesteric liquid crystal molecules and a plurality of transparent photoresist structures, each of the transparent photoresist structures is a closed structure, the cholesteric liquid crystal molecules are respectively accommodated in a plurality of patterned areas surrounded and formed by the transparent photoresist structures, so as to form a plurality of cholesteric liquid crystal patterns,
the upper transparent electrode layer is a patterned electrode layer and comprises a plurality of first sub-electrodes and a plurality of second sub-electrodes, the first sub-electrodes and the second sub-electrodes are alternately arranged to form a plurality of mutual capacitances,
the lower transparent electrode layer is configured as a common electrode,
the cholesteric liquid crystal patterns are respectively driven by the first sub-electrodes, and an orthogonal projection of each of the transparent photoresist structures on the lower substrate falls within an orthogonal projection of a corresponding first sub-electrode of the first sub-electrodes on the lower substrate,
the lower substrate is disposed between the display panel and the upper substrate.

2. The display device as recited in claim 1, wherein the orthogonal projection of each of the transparent photoresist structures on the lower substrate is smaller than the orthogonal projection of the corresponding first sub-electrode on the lower substrate.

3. The display device as recited in claim 1, wherein the transparent photoresist structures have hydrophobicity.

4. The display device as recited in claim 1, wherein the upper substrate and the lower substrate are flexible substrates.

5. The display device as recited in claim 1, wherein the first sub-electrodes are respectively connected to a plurality of driving circuits, and the second sub-electrodes are respectively connected to a plurality of sensing circuits.

6. The display device as recited in claim 1, wherein the cholesteric liquid crystal patterns are driven by a same one of the first sub-electrodes.

* * * * *